United States Patent [19]

Grundei

[11] Patent Number: 5,509,512
[45] Date of Patent: Apr. 23, 1996

[54] SHOCK ABSORBER WITH ADJUSTABLE DAMPING WITH CONTROLLED DAMPING CHARACTERISTICS

[75] Inventor: Manfred Grundei, Niederwerrn, Germany

[73] Assignee: Fichtel & Sachs AG, Schweinfurt, Germany

[21] Appl. No.: 197,690

[22] Filed: Feb. 17, 1994

[30] Foreign Application Priority Data

Feb. 17, 1993 [DE] Germany .......................... 43 04 701.7
Feb. 3, 1994 [DE] Germany .......................... 44 03 196.3

[51] Int. Cl.⁶ ............................... B60G 17/06; F16F 9/46
[52] U.S. Cl. ........................................... 188/284; 188/315
[58] Field of Search ................................. 188/280, 282, 188/284, 285, 314, 315, 299

[56] References Cited

U.S. PATENT DOCUMENTS

| | | | |
|---|---|---|---|
| 2,606,630 | 8/1952 | Rossman | 188/284 |
| 2,789,308 | 1/1956 | Koski et al. | 188/284 |
| 4,880,086 | 11/1989 | Knecht et al. | 188/299 |
| 5,096,025 | 3/1992 | Herberg | 188/285 |
| 5,219,414 | 6/1993 | Yamaoka | 188/284 |

FOREIGN PATENT DOCUMENTS

| | | | |
|---|---|---|---|
| 681818 | 3/1964 | Canada | 188/284 |
| 0386433 | 9/1990 | European Pat. Off. | 188/284 |
| 1251165 | 4/1968 | Germany . | |
| 1430494 | 4/1970 | Germany | 188/284 |
| 3330815 | 3/1985 | Germany . | |
| 3514360 | 10/1986 | Germany . | |
| 4013054 | 11/1990 | Germany . | |

*Primary Examiner*—Matthew C. Graham
*Attorney, Agent, or Firm*—Nils H. Ljungman & Associates

[57] ABSTRACT

A vehicle, including a vehicle body, a chassis with wheels and tires on which the vehicle rests, a number of vehicle suspension springs and shock absorbers which are mounted between the wheels and the vehicle body and execute a change in their axial length as a function of the wheel spring travel in the form of a displacement between a piston fastened to a piston rod and a pressure tube of the shock absorber, and thereby displace a damping medium through a damping device, as well as an arrangement to fasten the piston rod and the pressure tube to the vehicle body and the wheel, characterized by the fact that the shock absorber has a damping force family of characteristics which consists of at least three individual damping force families of characteristics, the first damping force family of characteristics of which is designed so that it exerts a very low damping force, whereby this damping force family of characteristics is located in the vicinity of the normal spring deflection range of the shock absorber, and makes a transition in the decompression and compression directions respectively into damping force families of characteristics which entail a greater damping force in relation to the stroke length, compared to the first damping force family of characteristics.

1 Claim, 32 Drawing Sheets

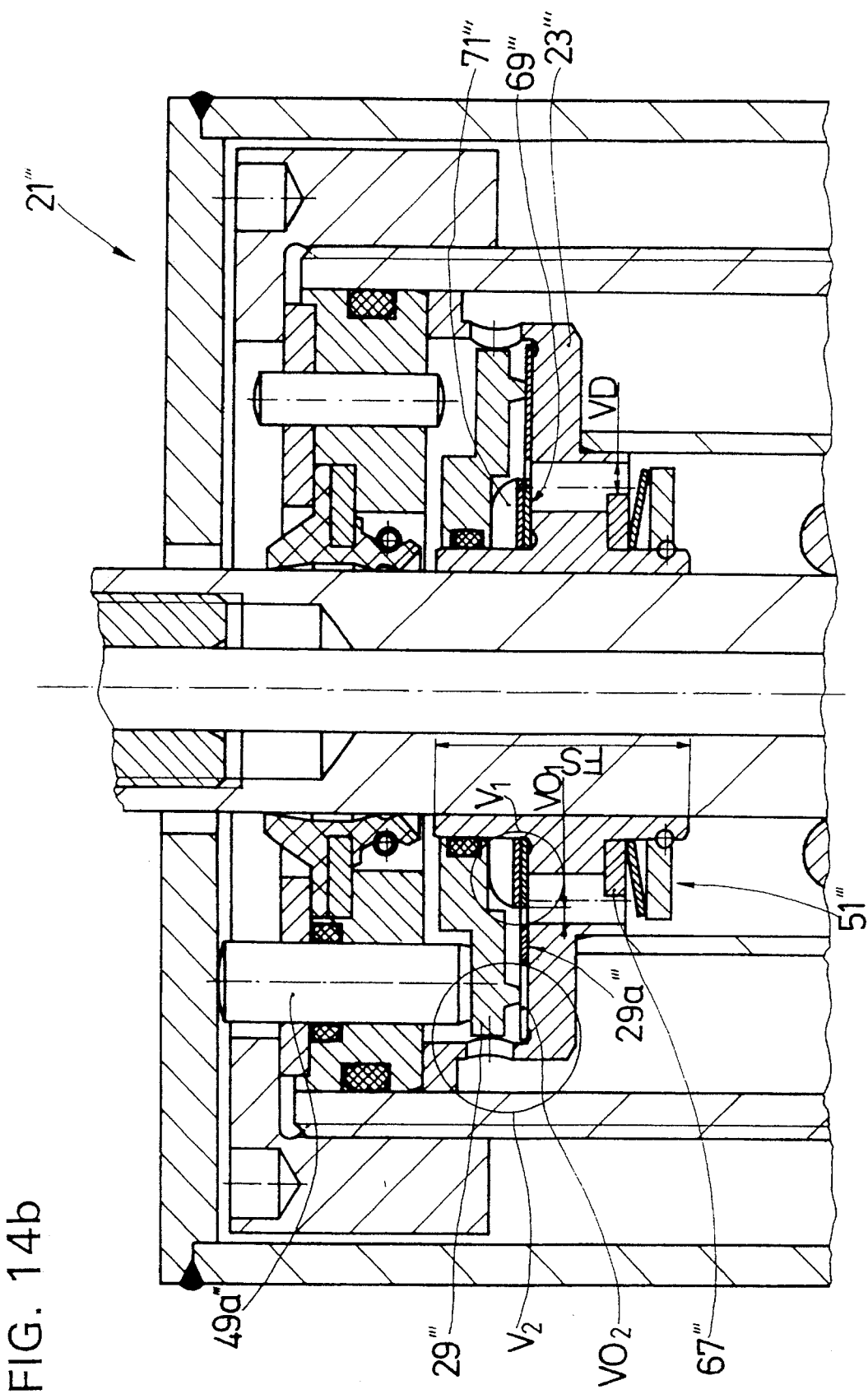

SHOCK ABSORBER WITH ADJUSTABLE DAMPING WITH CONTROLLED DAMPING CHARACTERISTICS

BACKGROUND OF THE INVENTION

1. Field of the Invention

This invention generally relates to a vehicle, comprising a vehicle body, a chassis with wheels and tires on which the vehicle rests, a number of vehicle suspension springs and shock absorbers which are mounted between the wheels and the vehicle body and which execute a change, in their axial length as a function of the wheel spring travel, in the form of a displacement between a piston fastened to a piston rod and a pressure tube of the shock absorber, and thereby displace a damping medium through a damping device, as well as means to fasten the piston rod and the pressure tube to the vehicle body and the wheel.

2. Background Information

It is generally known from technical literature that the interface between the tires and the road has a major influence on the comfort experienced by a driver. On one hand, there tend to be rough spots in the road, which, in terms of the total suspension system, can be evaluated in terms of an oscillation which varies from more than 15 Hz to approximately 60 Hz in connection with very small amplitudes. In addition, even with a very small radial tire run-out, there are frequencies which are in the range of approximately 30 to 100 Hz, and which can be very unpleasant for the driver and passengers in the vehicle. There is also the characteristic frequency of the vehicle springs.

Of course, the acoustical problem of frequencies from 30 to 100 Hz could be solved by massive use of insulation material, but that would increase the weight of the vehicle. Nor would it be very efficient to reduce the damping of the shock absorbers, since that would have a negative impact on the handling and safety of the vehicle.

OBJECT OF THE INVENTION

The object of the present invention is to solve the acoustical and vibration problems which occur on a vehicle, while keeping the weight and safety of the vehicle at the desired levels.

SUMMARY OF THE INVENTION

Generally, the invention teaches that this object can be achieved wherein the shock absorber has a damping force family of characteristics having at least three individual damping force families of characteristics, the first of which is designed so that a very low damping force is exerted. This first damping force family of characteristics is preferably located in the vicinity of the normal spring deflection range of the shock absorber and makes a transition in the decompression and compression directions, respectively, into damping force families of characteristics which, in comparison with the first damping force family of characteristics, entail a greater damping force in relation to stroke length.

As a result of the particular design of the first damping force family of characteristics in terms of the damping force, a passenger in the vehicle is largely isolated from the mechanical oscillations and the acoustical annoyance. The division of the stroke in connection with an adjusted damping force for the extreme spring excursions also improves the safety and handling of the vehicle.

An additional advantage is that the first damping force family of characteristics, in relation to the velocity of the spring deflection, represents a sharply degressive damping force behavior. Even when the road is uneven, i.e. on cobblestone pavement, which tends to have a very high-frequency effect on the shock absorbers, there is essentially no hardening of the shock absorber characteristic.

To improve vehicle handling and safety, the damping force families of characteristics adjacent to the first damping force characteristic, for the decompression and compression stage, in relation to the velocity of spring deflection, preferably have a progressive damping force behavior. An excessively soft ride can thus essentially be prevented.

Extensive calculations and tests have shown that the stroke for the first damping force family of characteristics advantageously has an effective length of less than about 10 mm. Generally, the objective is to keep the first damping force family of characteristics as small as possible, to avoid any losses in terms of vehicle safety and handling. As a result of the short stroke, the damping force level of the first damping force family of characteristics can be very sharply reduced.

The damping force families of characteristics, apart from the first one, can be defined very easily, because they each have a hydraulic-mechanical stop.

It is particularly advantageous in terms of vehicle safety and handling if the shock absorber is load-controlled. In this manner, the damping force level in the first damping force family of characteristics can be reduced very significantly.

Alternatively, a level control system can be connected to the shock absorber. Using this measure, the vehicle can be adjusted in the normal position to the first damping force family of characteristics. The stroke length for the first damping force family of characteristics can be set very precisely to the shortest dimension.

So that the shock absorber does not lose any of its effectiveness as compared with a conventional shock absorber in terms of its "damping performance" the area of the damping force characteristic in relation to the stroke is at least as great as that of a shock absorber which has a constant damping force characteristic in relation to the stroke.

So that the shock absorber can advantageously filter out the interference felt by the driver, the first damping force family of characteristics advantageously has a maximum stroke velocity of up to 2 m/s in the compression direction. Thus, even very high-frequency excitations can be compensated for.

To execute the stroke for the first damping force family of characteristics, a bypass channel can be formed into the pressure tube of the shock absorber. In connection with the stops for the decompression and compression direction, for example, it is very easily possible to achieve a damping force characteristic with a low damping force for a short stroke range.

According to an additional characterizing feature, the load-dependent damping valve is located inside the piston rod guide, whereby an additional load-independent damping valve is connected in series to the load-dependent damping valve. As a result of the combination of these two valves, the adjustment of the controlled family of characteristics, in particular in the vicinity of the normal position, can be executed with great precision. The load-dependent damping valve is thereby actuated by the vehicle suspension spring. After a specified positioning distance, the load-dependent damping valve is also advantageously pressurized by a pressure pad. As a result of this additional component, when there is a suspension spring, the damping force families of characteristics can be individually adapted to the vehicle. This measure relates in particular to a progressive damping force increase in the vicinity of the stroke position which corresponds to a fully-loaded vehicle. As an additional adjustment of the shock absorber to the controlled family of characteristics, a damping valve which is additively superimposed is located in the piston with the two damping valve in the piston rod guide. To limit the action of the hydraulic decompression stop, there is a pressure relief valve for the decompression direction. Unacceptable damping force peaks can thereby be prevented.

The sealed cylinder notably has an essentially constant cross section, so that there is no additional space required beyond that required for a shock absorber of the prior art. To reduce the axial size, there is a gas pocket located inside the equalization chamber. As a result of this advantageous measure, the damping valve in the piston rod guide facing the equalization chamber is always filled on its rear side with damping medium, so that during flow through the damping valves into the equalization chamber, no foaming can take place.

It is also possible to take a generally different approach, by equipping the shock absorber with an adjustable damping device and a position detection device. Such a position detection device would transmit a position signal to a computer, and the computer would, in turn, determine the damping force families of characteristics from the position signals, and specifies the softest damping force setting for the first damping force family of characteristics, and an increasingly harder damping force setting for the additional damping force families of characteristics in the stroke direction of the extreme positions of the shock absorber. In particular for a continuously adjustable damping device, the transitions between the damping force families of characteristics can be particularly soft.

In summary, one aspect of the invention resides broadly in a shock absorber for a motor vehicle, such a motor vehicle including: a vehicle body; a chassis supporting the vehicle body, the chassis comprising at least two axles and at least two pairs of wheels, each the at least two pairs of wheels being mounted on a corresponding one of the axles, a suspension connected between a corresponding one of the axles and the vehicle body, the suspension being movable through an entire stroke range, the entire stroke range extending between an upper limit, wherein the corresponding axle between an upper limit, wherein the corresponding axle is disposed in closest vertical proximity to a point of reference on the vehicle body, and a lower limit, wherein the corresponding axle is disposed at a maximum vertical distance from the point of reference on the vehicle body, wherein the shock absorber is for being connected between one of the wheels and the vehicle body and is for being oriented generally in parallel with respect to the suspension; the shock absorber comprising: a sealed cylinder defining a chamber therein, the cylinder containing a damping fluid; a piston rod sealingly projecting into the cylinder and being axially displaceable with respect to the cylinder; a piston being attached to the piston rod, the piston rod being slidably disposed within the cylinder to sealingly divide the chamber into first and second chambers; means for permitting flow of damping fluid between the first and second chambers; the piston being displaceable through an entire stroke range, the entire stroke range generally corresponding to the entire stroke range of the suspension; the piston being displaceable through a first stroke range and a second stroke range, the first stroke range being different from the second stroke range; means for damping the movement of the piston as a function of the displacement of the piston; the damping means comprising: first damping means for providing a first damping force function when the piston is being displaced through the first stroke range; second damping means for providing a second damping force function when the piston is being displaced through the second stroke range; the first damping force function varying as a first function of the displacement of the piston; and the second damping force function varying as a second function of the displacement of the piston, the second function being different from the first function; and means for effecting a change in damping between the first damping force function and the second damping force function in relation to at least one position of the piston within a substantial portion of the entire stroke range of the piston.

Another aspect of the invention resides broadly in a motor vehicle comprising: a vehicle body; a chassis supporting the vehicle body; the chassis comprising at least two axles and at least two pairs of wheels, each the at least two pairs of wheels being mounted on a corresponding one of the axles; a suspension connected between a corresponding one of the axles and the vehicle body; the suspension being movable through an entire stroke range, the entire stroke range extending between an upper limit, wherein the corresponding axle is disposed in closest vertical proximity to a point of reference on the vehicle body, and a lower limit, wherein the corresponding axle is disposed at a maximum vertical distance from the point of reference on the vehicle body; a shock absorber being connected between one of the wheels and the vehicle body and being oriented generally in parallel with respect to the suspension; the shock absorber comprising: a sealed cylinder defining a chamber therein, the cylinder containing a damping fluid; a piston rod sealingly projecting into the cylinder and being axially displaceable with respect to the cylinder; a piston being attached to the piston rod, the piston rod being slidably disposed within the cylinder to sealingly divide the chamber into first and second chambers; means for permitting flow of damping fluid between the first and second chambers; the piston being displaceable through an entire stroke range, the entire stroke range generally corresponding to the entire stroke range of the suspension; the piston being displaceable through a first stroke range and a second stroke range, the first stroke range being different from the second stroke range; means for damping the movement of the piston as a function of the displacement of the piston; the damping means comprising: first damping means for providing a first damping force function when the piston is being displaced through the first stroke range; second damping means for providing a second damping force function when the piston is being displaced through the second stroke range; the first damping force function varying as a first function of the displacement of the piston; and the second damping force function varying as a second function of the displacement of the piston, the second function being different from the first function; and means for effecting a change in damping between the first damping force function and the second damping force function in relation to at least one position of the piston within a substantial portion of the entire stroke range of the piston.

BRIEF DESCRIPTION OF THE DRAWINGS

The invention and its advantages are explained in greater detail below, with reference to the accompanying drawings, in which:

FIG. 1ab is a general view of a shock absorber which may be configured in accordance with the present invention;

FIG. 1a is substantially the same view as FIG. 1, but more detailed;

FIGS. 6–11 illustrate a damping force family of characteristics according to the present invention, wherein:

FIG. 6 illustrates a damping force family of characteristics in three-dimensional view;

FIG. 7 shows a decompression portion of the view of FIG. 6;

FIG. 8 is a two-dimensional side view of the view of FIG. 7;

FIG. 9 is another two-dimensional side view of the view of FIG. 7;

FIG. 10 shows a compression portion of the view of FIG. 6; and

FIG. 11 is a two-dimensional side view of the view of FIG. 10;

FIGS. 12a, 12b, 12c, 12d, 12e, 12f, 12g, 12h, 13, 14a–14e, 15 and 16 illustrate alternative embodiments of the present invention, wherein:

FIGS. 12a–12h show a damping force family of characteristics;

FIG. 13 shows a load-controlled shock absorber;

FIGS. 14a, 14b, 14c, 14d, 14e show another load-controlled shock absorber;

FIG. 15 shows a pneumatic spring; and

FIG. 16 shows a shock absorber with a continuously adjustable damping force.

DESCRIPTION OF THE PREFERRED EMBODIMENTS

Figure 1:
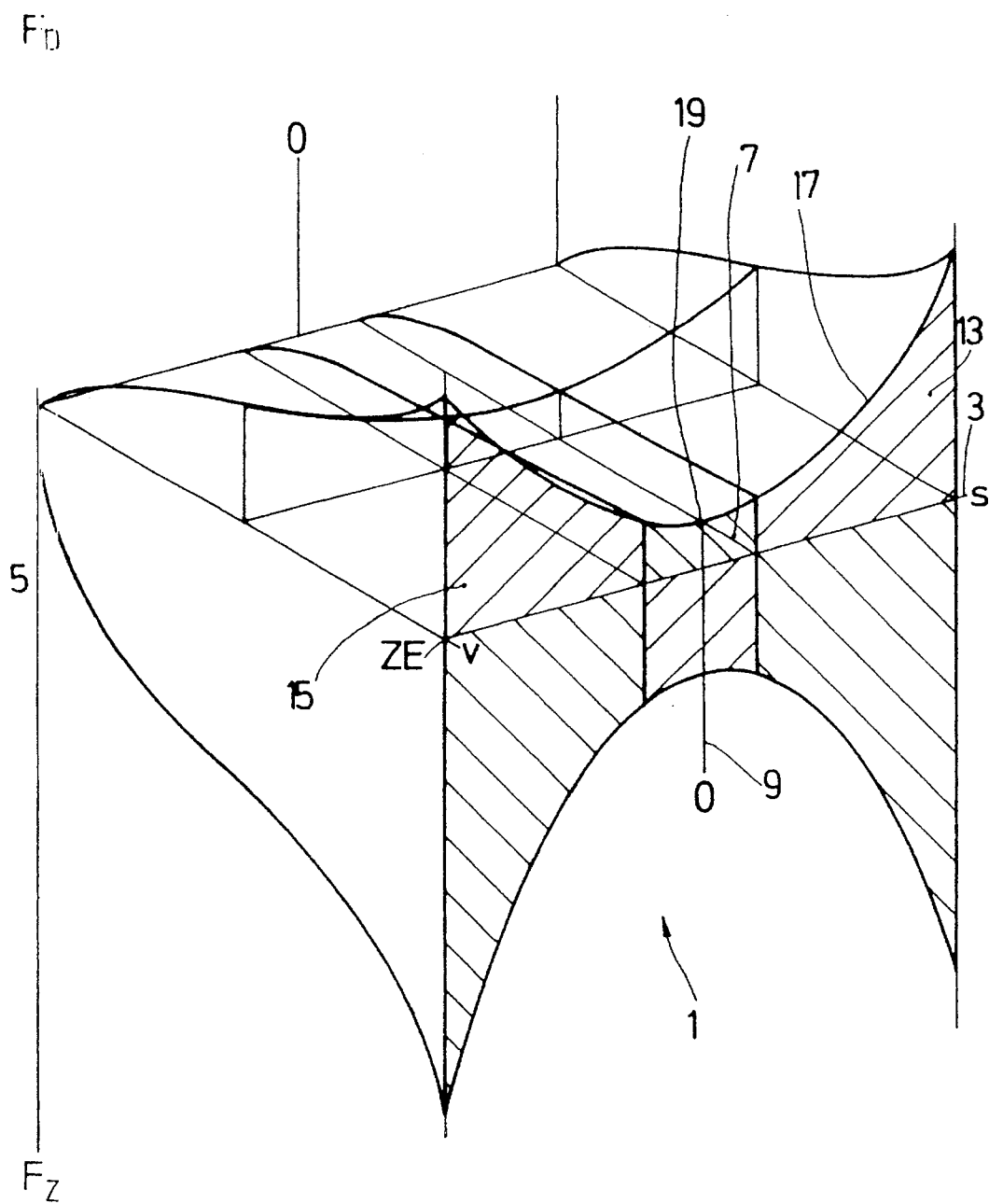
FIG. 1 illustrates a damping force family of characteristics.
Figure 1A:
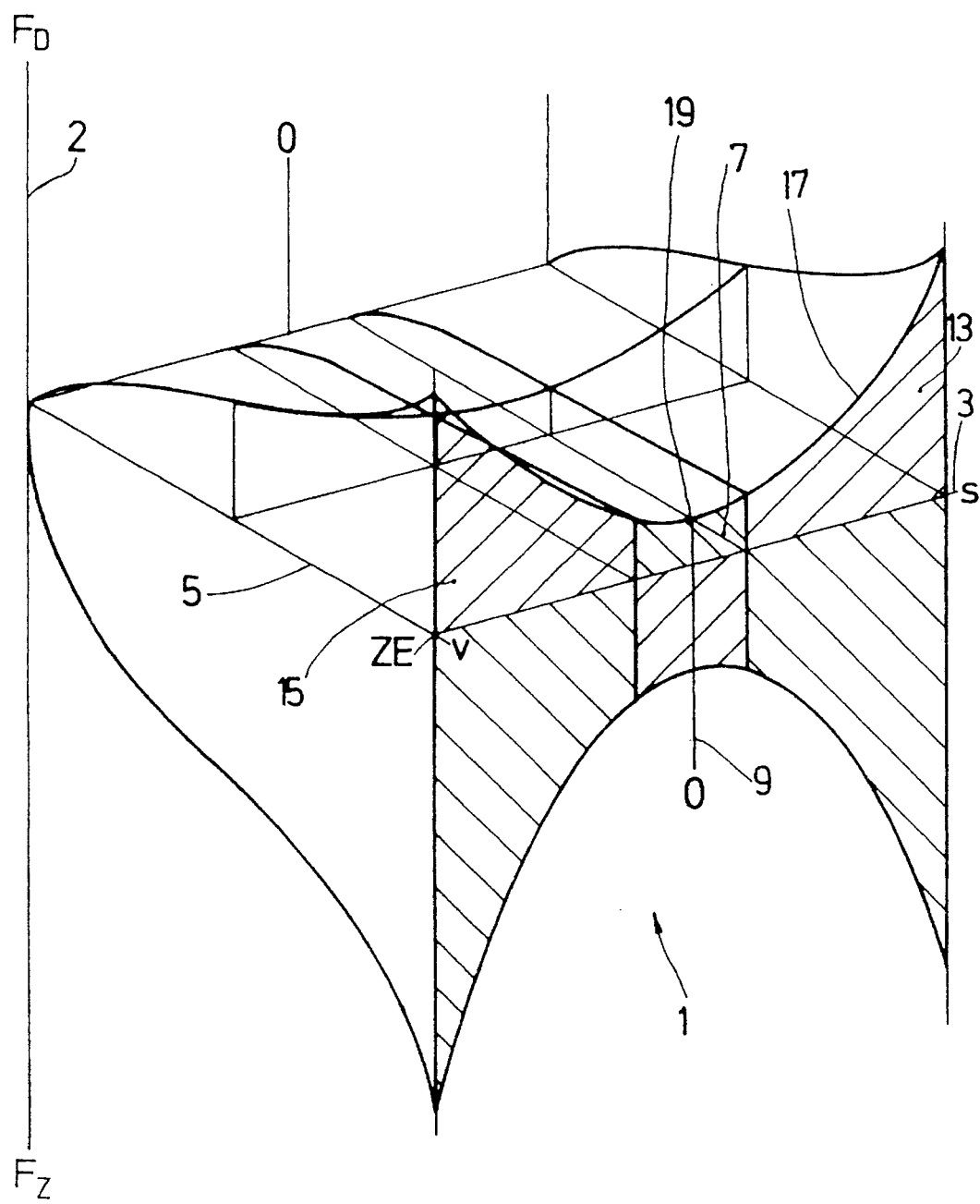
FIG. 1aa illustrates an automobile which may employ a shock absorber according to the present invention.
Figure 1A:
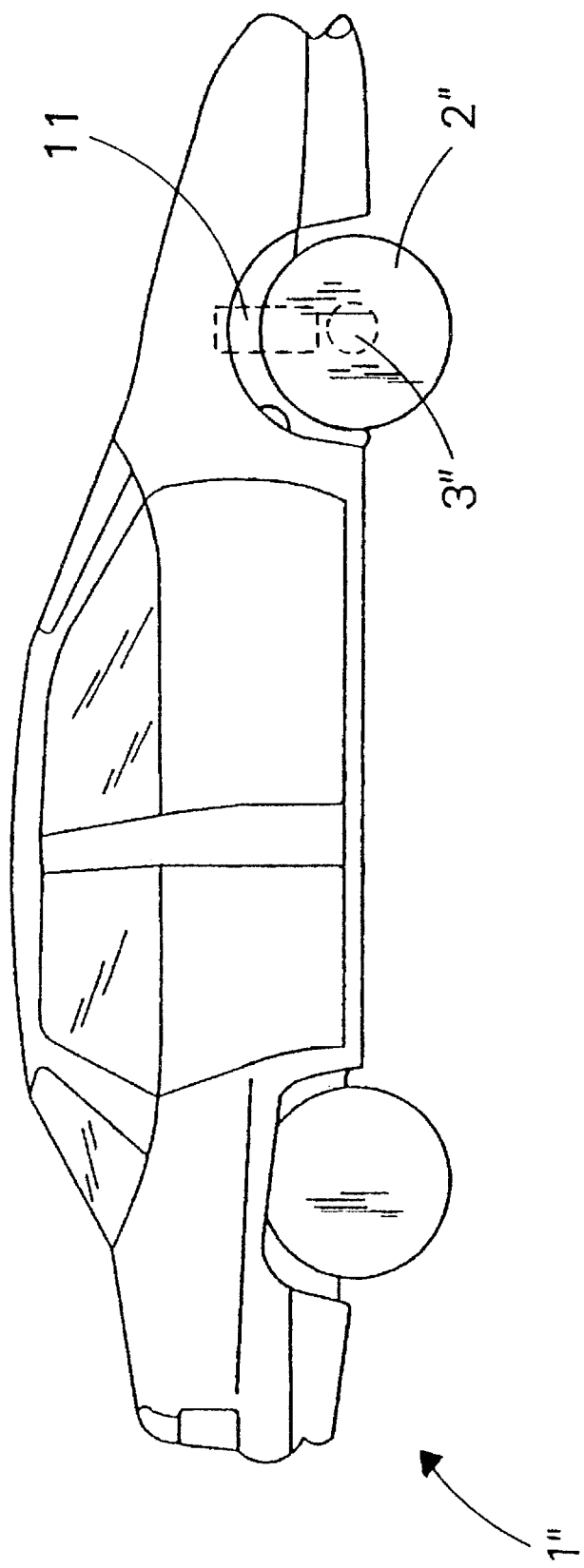
Figure 1A:
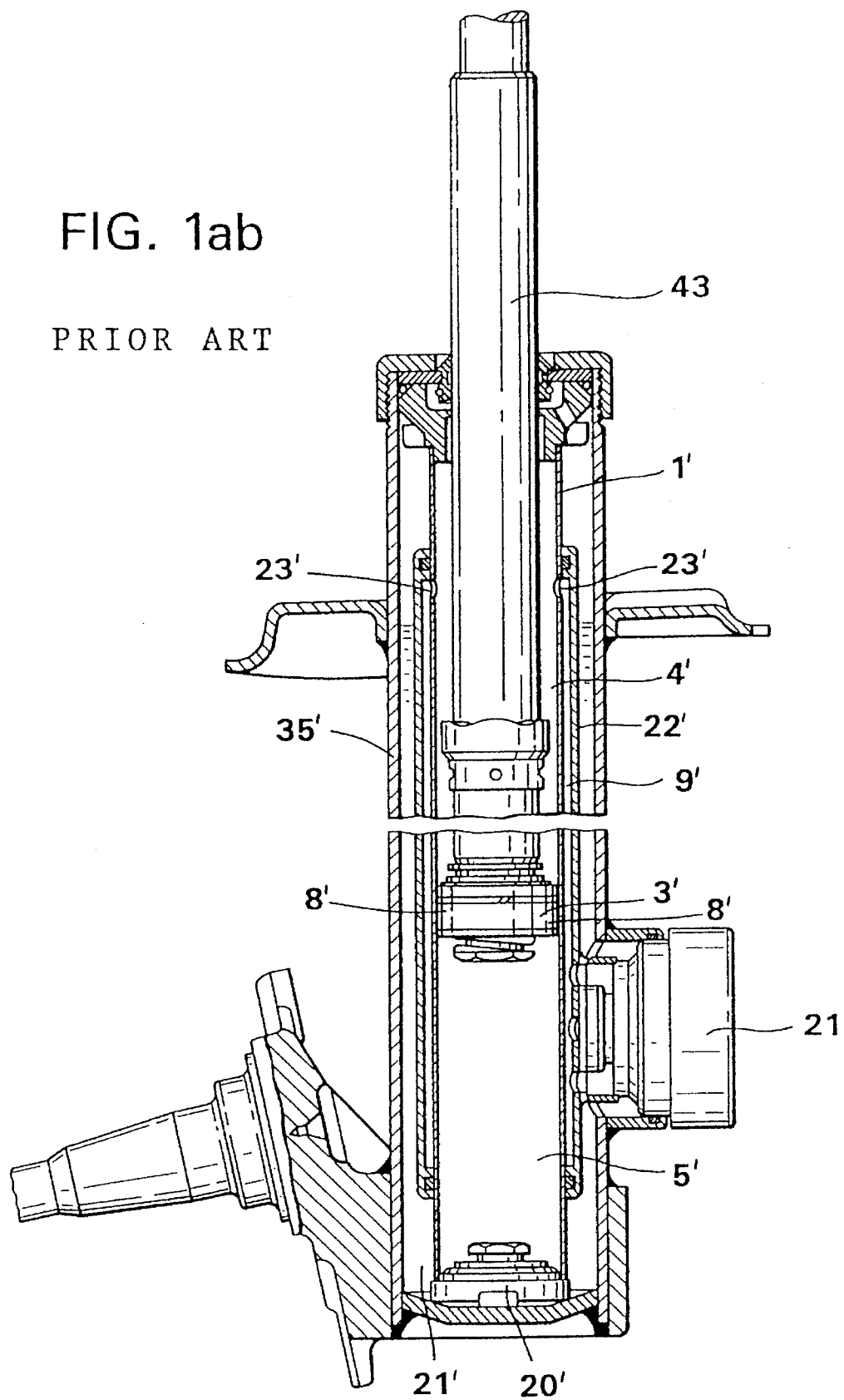

FIG. 1aa illustrates an automobile 1" which may employ a shock absorber in accordance with the present invention. In a known manner, a wheel 2" is supported by an axle 3". Substantially in the vicinity of wheel 2", a shock absorber 11 is preferably connected, in a known manner, between axle 3" and the body of the automobile 1".

FIG. 1ab shows an example of a shock absorber which may be employed in accordance with the embodiments of the present invention. As illustrated in FIG. 1ab, an adjustable two-tube shock absorber can generally include a cylinder 1', which sealingly contains a hydraulic fluid, a piston rod 43, which piston rod 43 can sealingly project into cylinder 1' and which piston rod 43 can be axially displaceable with respect thereto, and a damping piston 3', which damping piston 3' can be sealingly disposed within cylinder 1' and can be connected to piston rod 43. Piston rod 43 can be attached to a structure portion, e.g., of a vehicle, which is not shown. Piston 3' can divide cylinder 1' into upper and lower working chambers 4' and 5', respectively, and can be provided with axially throughgoing passages and associated bottle valves 8' of conventional design and well known in the art, which can provide a substantially constant and non-variable resistance to the axial displacement of piston 3' and piston rod 43.

Two additional cylinders of progressively greater diameter 22' and 35' can be disposed coaxially with cylinder 1', so as to surround cylinder 1', thereby providing two additional annular chambers, a bypass chamber 9' and an equalization chamber 21'. Bypass chamber 9' can interconnect with the working chambers via orifices 23', and a valve 20', located at the bottom of cylinder 1'. The bypass chamber 9' can provide a means by which the damping medium contained therein can reach equalization chamber 21'.

A damping force control unit 21, which can act hydraulically in parallel with throttle valves 8' to modify the substantially constant damping force which throttle valves 8' can provide, can be mounted as a separate component attached to the shock absorber, and can be in fluid communication with bypass 9' and equalization chamber 21'.

FIG. 1 shows a damping force family of characteristics 1, which is plotted as a function of the stroke (s-axis) 3 and velocity (v-axis). In terms of the stroke, the damping force family of characteristics 1 is preferably divided into at least three individual damping force families of characteristics. A first damping force family of characteristics 7 lies in the range of the normal stroke position 9 of a shock absorber 11. The maximum stroke range of the first damping force family of characteristics 7 can be restricted to approximately the spring deflection which is transmitted by one tire to the shock absorber, when the car is travelling over a manhole cover or cobblestone streets. The minimum stroke range is approximately on the order of the roughness of the road. Adjacent to the first damping force family of characteristics are the damping force families of characteristics 13 and 15, which can be employed when a larger spring deflection is required.

In relation to the velocity axis 5, the first damping force family of characteristics 7 preferably has a very degressive damping force characteristic 17, with a correspondingly low damping force peak at the maximum spring deflection velocity. The damping force families of characteristics 13 and 15 each preferably have a damping force curve which, at relatively low velocities and/or in the vicinity of the first damping force family of characteristics 7, has a degressive damping force behavior, but which, with increasing spring deflection velocity in the stroke range near the limit positions of the shock absorber, assumes a sharply progressive damping force behavior.

The damping force family of characteristics 1 can be realized particularly well in a level-controlled shock absorber, since the normal stroke position 9 of the shock absorber, regardless of the load status of the vehicle, can usually always be kept in the first damping force family of characteristics 7. Alternatively, of course, it is also possible to design the damping force family of characteristics 1 as a function of the load. The bottom 19 of the curve of the damping force characteristic 17 would thus be shifted in the decompression direction (indicated in FIG. 1 as "ZE").

Thus, in accordance with a preferred embodiment of the present invention, FIGS. 1 and 1a illustrate a damping force family of characteristics 1 according to the present invention. The force axis, which is vertical, is indicated at 2, while the stroke axis, or the "s-axis", is indicated at 3 and the velocity axis, or "v-axis" is indicated at 5. As viewed along the s-axis 3, the damping force family of characteristics is divided into three individual damping force families of characteristics 7, 13 and 15. As illustrated, a first damping force family of characteristics 7 straddles the normal stroke position 9 of the shock absorber in question.

Figure 2:
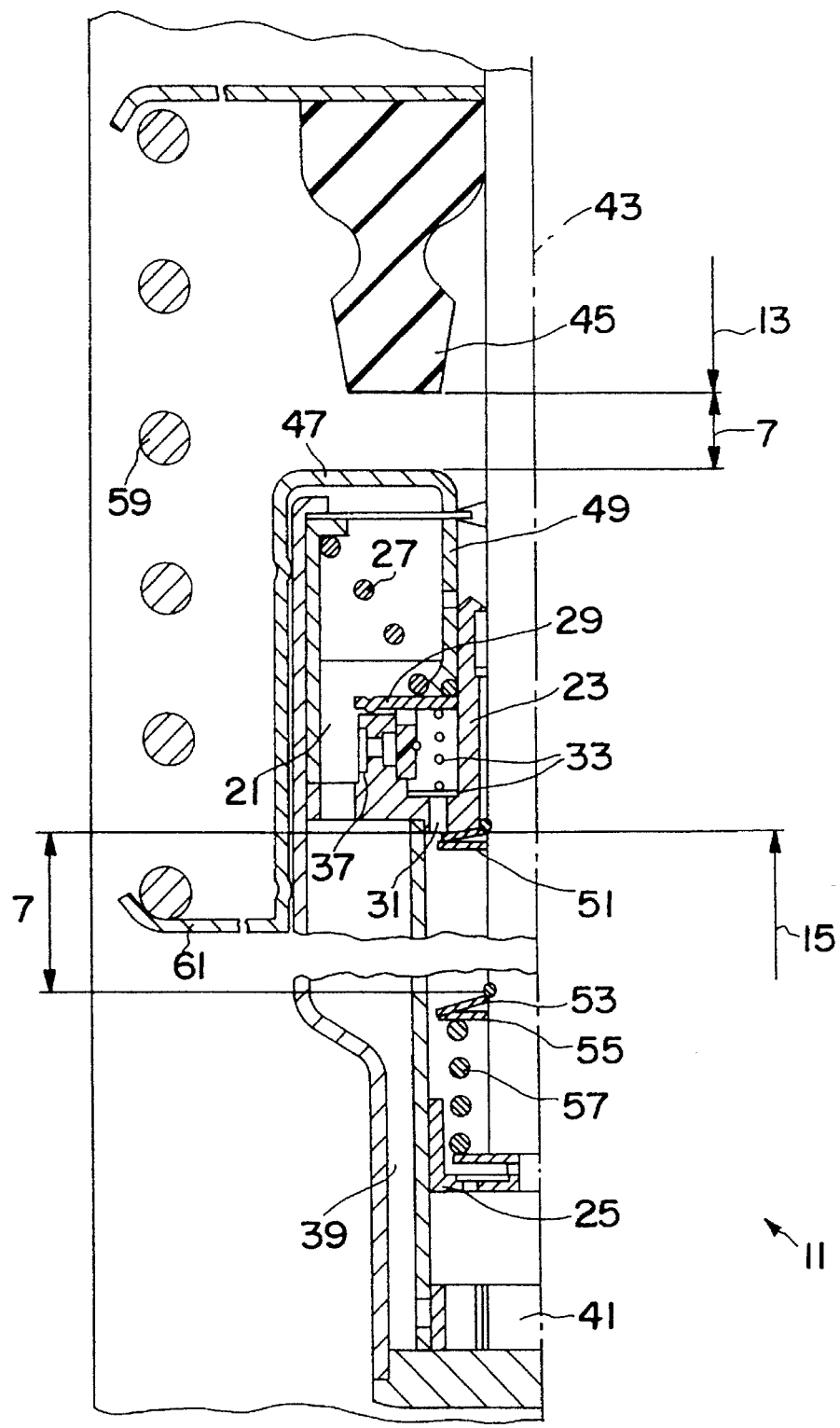
FIG. 2 illustrates a load-controlled shock absorber.

FIG. 2 shows one possible embodiment of a shock absorber 11 according to the present invention, in which a damping force family of characteristics with a shifted bottom 19 of the curve is realized. The damper is realized in the form of a spring strut, whereby there is a damping force device 21 in the upper end region of the shock absorber 11 inside a piston rod. The damping device 21 transmits the flow in only one direction, so that the same damping force can be exerted in the decompression and in the compression direction, since the piston valve 25 is designed as a non-return valve. The basic damping force is preferably generated by a very weak conical wire spring 27, which pushes a valve disc 29 against a valve seat 30 (see FIG. 2a). The displaced damping medium flows through the piston rod guide 23 through an inflow passage 31, the inflow passage 31 being equipped with a non-return valve 33. An outflow passage 35 (see FIG. 2a), which also has a non-return valve 37, forms the connection to an equalization chamber 39. The equalization chamber 39 preferably communicates with the work chamber via a non-return valve 41 in the form of an elastic slotted ring.

When the spring is deflected, a piston rod 43 is inserted into the shock absorber 11. The damping medium flows through the damping device 21 and reaches the equalization chamber 39. Preferably, within the spring deflection in the insertion direction, between a compression pad 45 and a stop surface 47 of a control sleeve 49, starting from the deflection point at which a hydraulic-mechanical decompression stop 51 has just been tripped, the damping force family of characteristics 7 is located, and has a basic damping force which is defined by the conical coil spring 27. For the remainder of the spring deflection, the pressure pad 45 presses against the control sleeve 49 and thereby increases the pre-stress on the valve disc 29. This spring deflection is in the damping force family of characteristics 13. In the reverse deflection direction, when the hydraulic-mechanical decompression stop 51, comprising a disc 55 braced between a spring plate 53 and a coil spring 57, together with the piston rod 43 has reached the inflow channel 31 on the piston rod guide 23, the damping force family of characteristics 15 preferably begins, whereby the spring plate 53, by interacting with the disc 55, reduces the cross section of the inflow channel 31 and thus allows the damping force to increase.

The basic setting of the damping force generated by the conical coil spring 27 can be superimposed in an additive manner on a vehicle suspension spring 59, since the plate spring 61 transmits the spring force to the control sleeve 49. With this measure, the shock absorber can be load-controlled, and thus the position of the damping force characteristic trough 19 can be shifted in the decompression direction. Of course, this embodiment of a shock absorber can also be designed so that it operates independently of the load, by disabling the transmission connection between the spring plate 61 and the control sleeve 49.

Figure 2A:
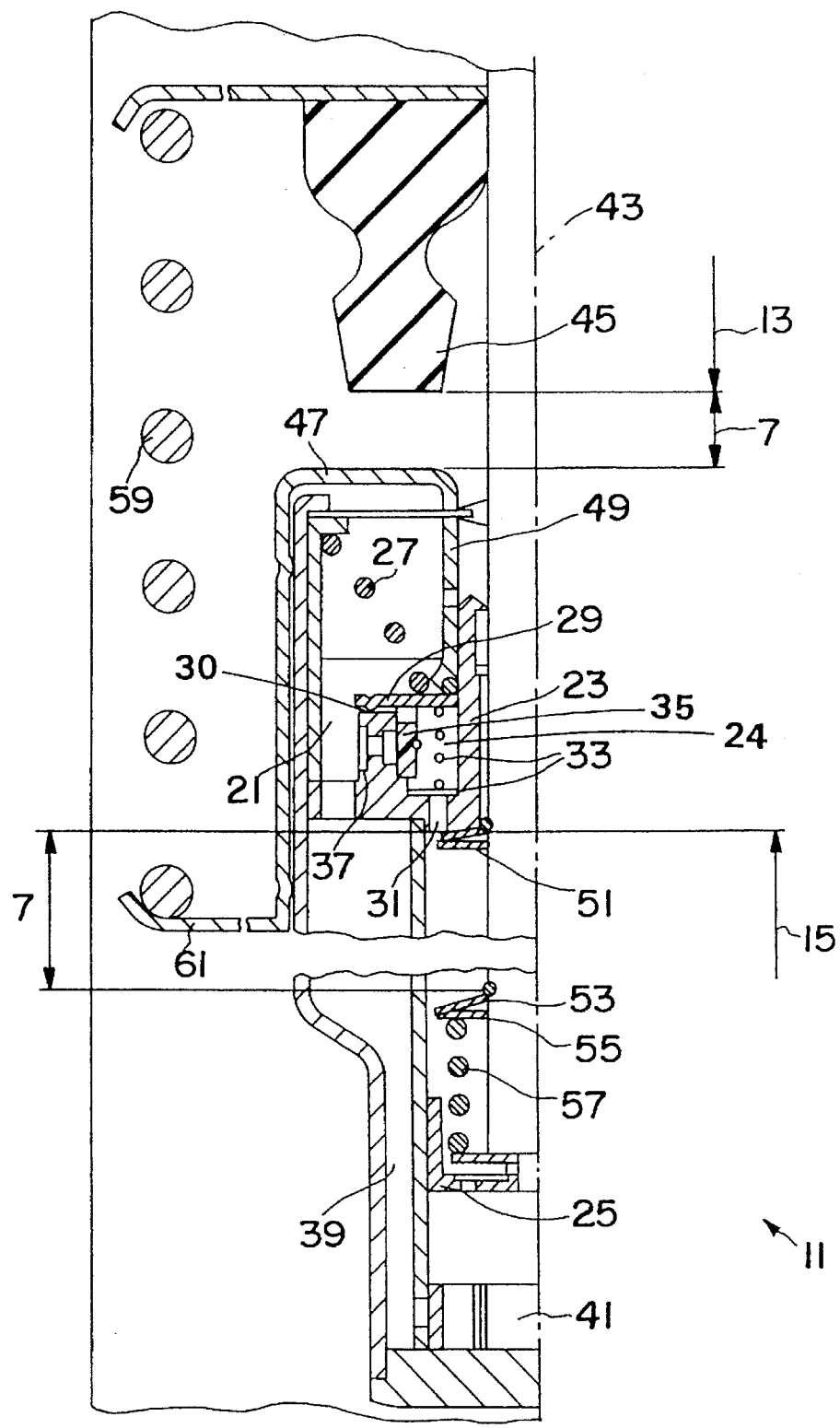
FIG. 2a is substantially the same view as FIG. 2, but more detailed.

Thus, in accordance with a preferred embodiment of the present invention, as illustrated in FIGS. 2 and 2a, damping device 21 transmits damping medium only in one direction, whether the shock absorber is undergoing compression or decompression. As such, both during compression and decompression, damping medium is preferably transmitted through inflow passage 31 and non-return valve 33 to chamber 24 and outflow passage 35. From outflow passage 35, the damping medium preferably flows out through non-return valve 37 and subsequently to equalization chamber 39.

It should be understood that, when the first damping force family of characteristics 7 is in effect, damping medium will also flow out from chamber 24 between valve disc 29 and valve seat 30. However, essentially from the point that stop surface 47 of control sleeve 49 contacts pressure pad 45, the damping force family of characteristics 13 will be in effect. Particularly, when pressure pad 45 presses against control sleeve 49, the prestress of valve disc 29 against valve seat 30 is essentially increased, thereby inhibiting the flow of damping medium between valve disc 29 and valve seat 30. In accordance with a preferred embodiment of the present invention, as a function of the degree of prestress, or compressive force, on valve disc 29, which would essentially bias the same more towards valve seat 30, the flow of damping medium is constricted in such a manner as to increase the damping force as a function of stroke.

Preferably, if the piston rod 43 is displaced in a direction opposite from pressure pad 45, the damping force family of characteristics 15 will come into effect when decompression stop 51 reaches the mouth of inflow channel 31. At that point, with greater stroke, the degree of closure of inflow channel 31 will essentially preferably increase in a manner which results in the damping force family of characteristics 15.

Preferably, the basic force of damping spring 27 may be supplemented by the force provided by a vehicle suspension spring 59, wherein the prestress provided by vehicle suspension spring 59 could conceivably be preset so as to vary the position, with respect to the graph shown in FIGS. 1 and 1a, of the damping force characteristic trough 19. For operation independent of the load provided by vehicle suspension spring 59, the force transmission connection between spring plate 61 and control sleeve 49 could be disabled.

Figure 3:
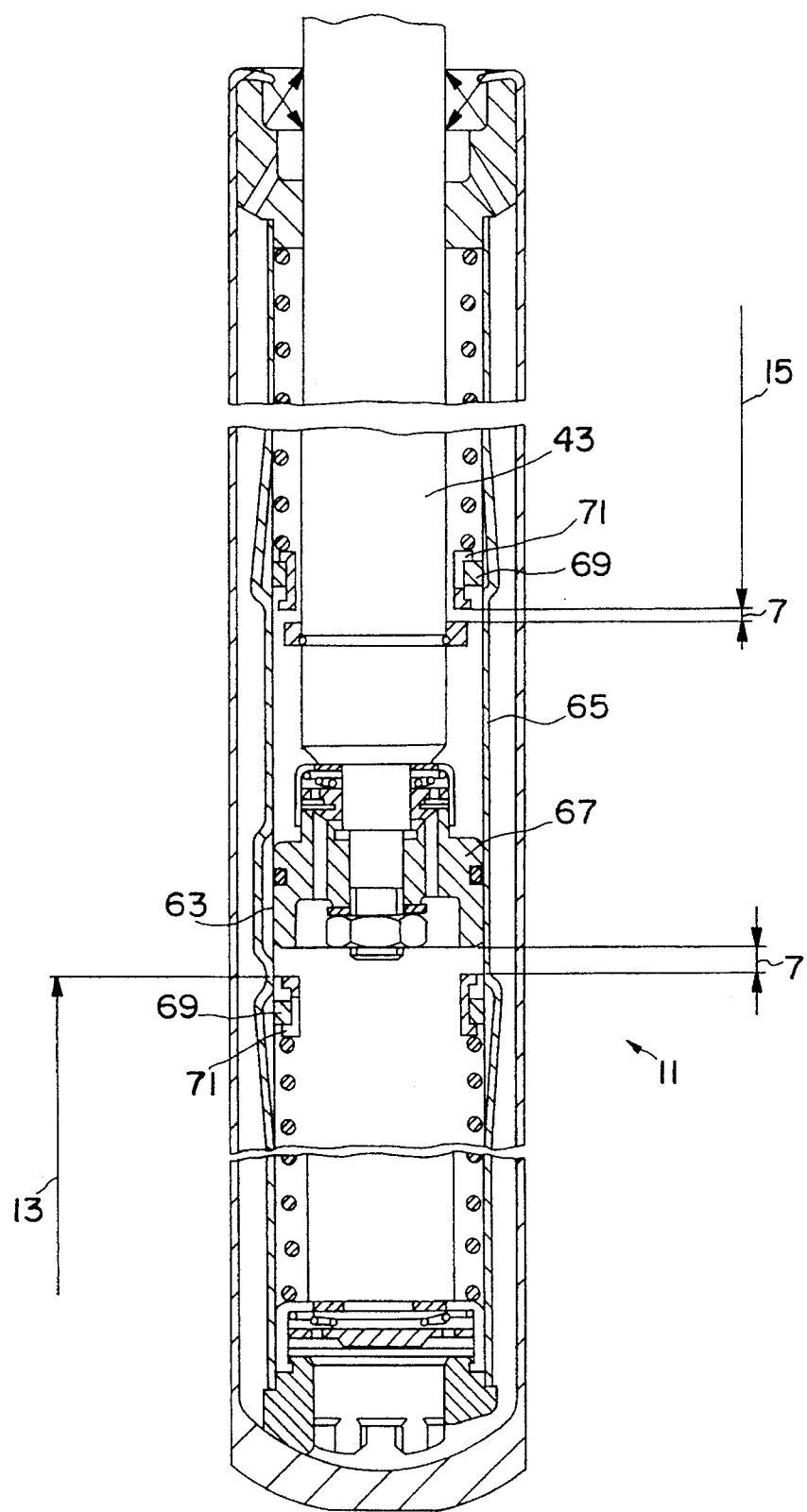
FIG. 3 illustrates a shock absorber with a bypass channel.

FIG. 3 illustrates a shock absorber 11 in a two-tube configuration with a basic layout which may preferably be essentially the same as known shock absorbers. In this embodiment, the damping force family of characteristics 1 is realized by a bypass channel 63 in a pressure tube 65 for the first damping force family of characteristics 7, together with one hydraulic-mechanical stop each for decompression and compression.

In FIG. 3, the shock absorber 11 is shown in the normal stroke position 9 (see FIG. 1). The length of the bypass channel 63 is preferably longer than the effective compression length on the piston 67 by an amount corresponding to the stroke length of the damping force family of characteristics 7. In each stroke direction, there is a compression and decompression stop respectively in the form of a slotted ring 69 inside a control sleeve 71. The ring 69 is preferably under a radial prestress in relation to the pressure tube 65, so that a friction force can be created. If the piston 67 leaves the damping force family of characteristics 7 in any direction, then a stop 73 (see FIG. 3a) on the piston rod 43 or a stop surface 75 (see FIG. 3a) on the piston 67 displaces the ring 69. As a result of this displacement of ring 69, a radially narrowing bypass channel 63 is partly closed as a function of the stroke, and a progressive damping force can thus be exerted.

Figure 3A:
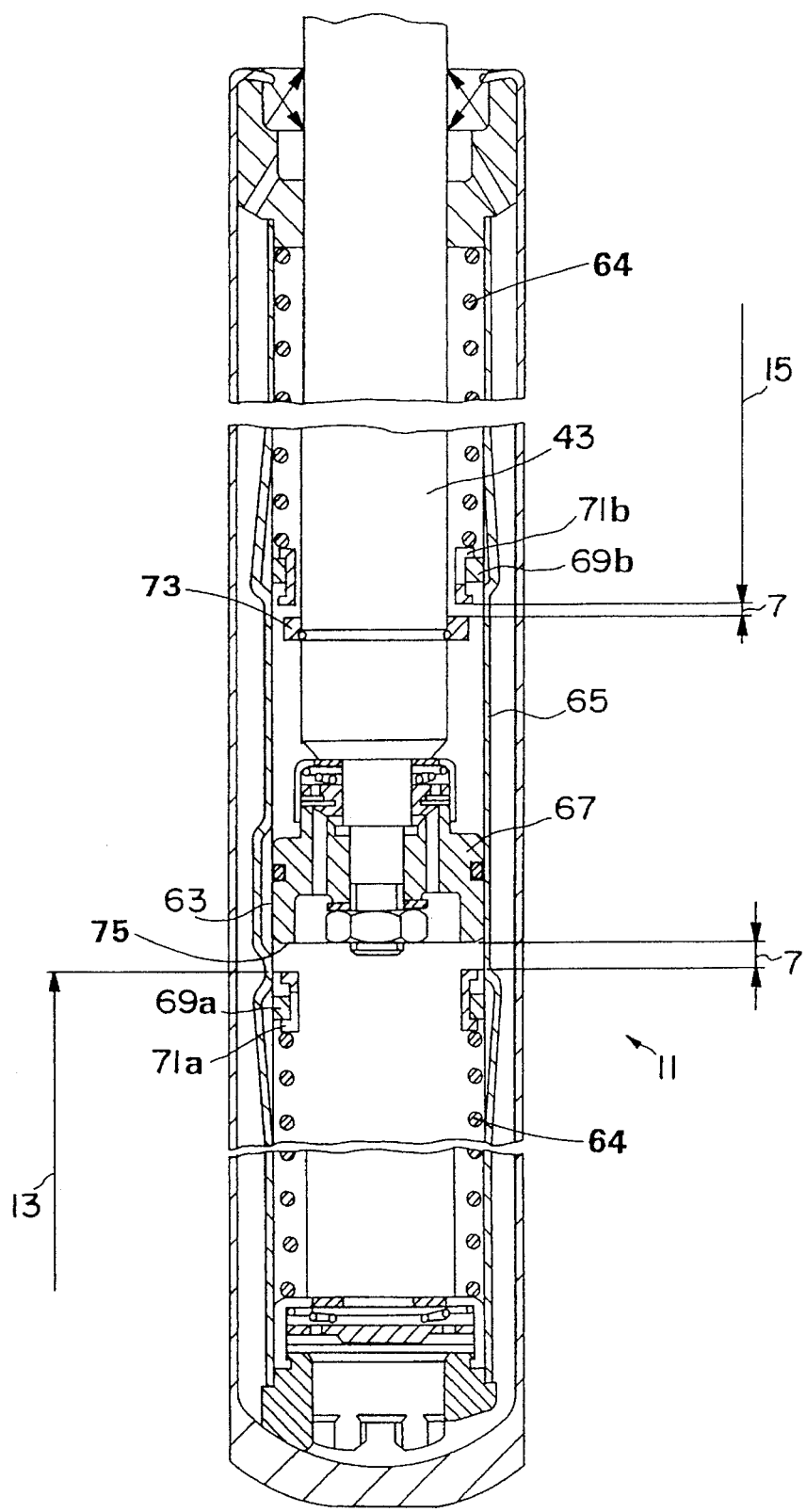
FIG. 3a is substantially the same view as FIG. 3, but more detailed.

Thus, as illustrated in FIGS. 3 and 3a, in accordance with a preferred embodiment of the present invention, the damping force family of characteristics 7 may be in effect when the stroke is such that neither control sleeve 71a or 71b is contacted, respectively by stop surface 75 or stop 73. Preferably, when the stroke is such that stop surface 75 contacts control sleeve 71a, ring 69a, because of radial prestress, will essentially be displaced radially outwardly in such a way as to constrict the width of bypass channel 63 and thus reduce the flow of damping medium as a function of stroke to achieve the damping force family of characteristics 13. Likewise, when the stroke is such that stop 73 contacts control sleeve 71b, ring 69b, because of radial prestress, will essentially be displaced radially outwardly in such a way as to constrict the width of bypass channel 63, and thus reduce the flow of damping medium as a function of stroke to achieve the damping force family of characteristics 15. In the axial direction of shock absorber 11, both rings 69a and 69b are preferably supported by corresponding springs 64.

Figure 4:
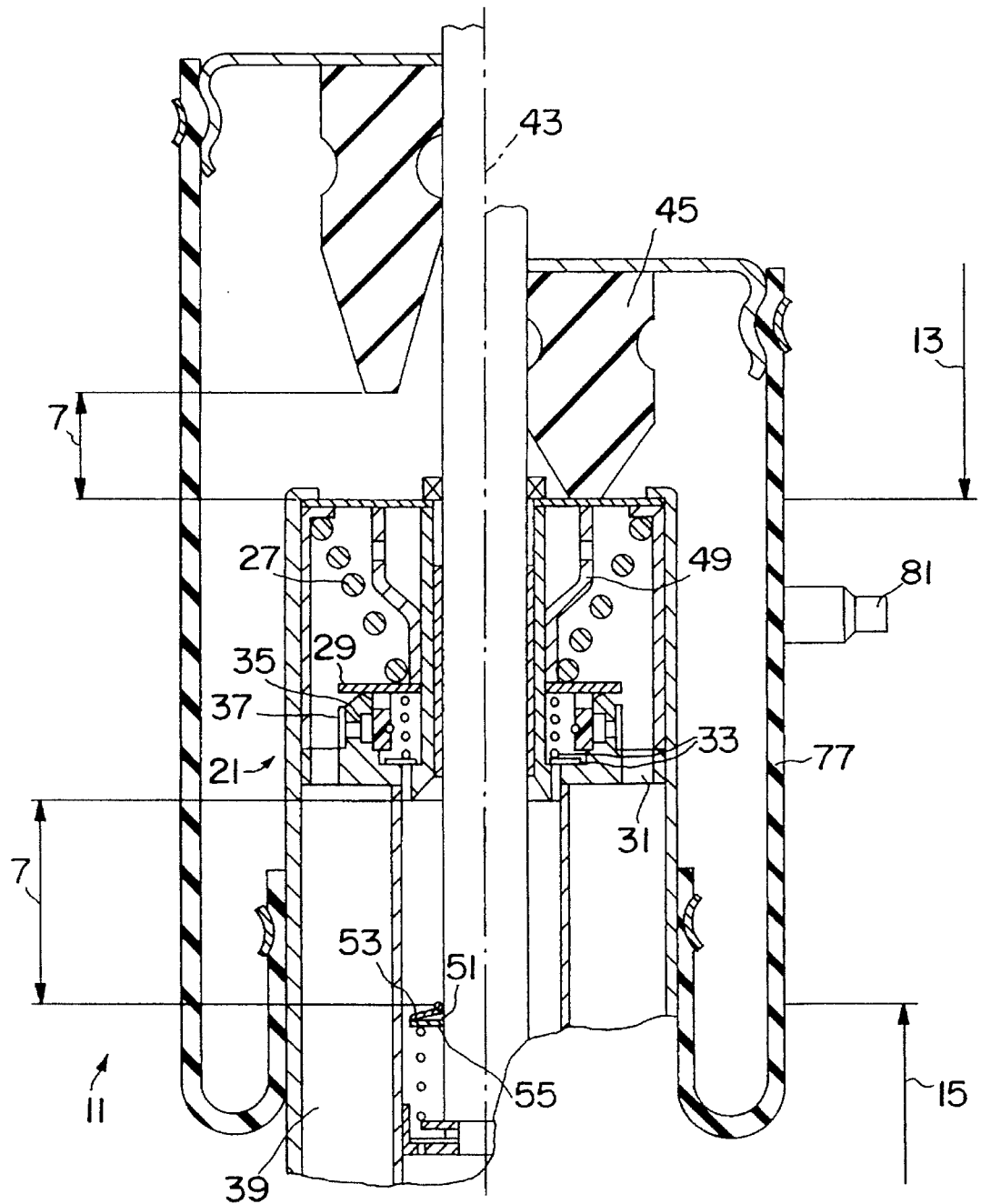
FIG. 4 illustrates a pneumatic spring.

In accordance with another preferred embodiment of the present invention, FIG. 4 shows a shock absorber 11 with load-independent damping. On the shock absorber, there may preferably be a pneumatic spring with a level control system as a vehicle suspension spring. The basic structure may be essentially the same as illustrated in FIG. 2, with the distinction that a pneumatic spring designed as an expansion bellows 77 can be used as the vehicle suspension spring.

The load-independent operation within the damping force family of characteristics 7 of the shock absorber 11 is preferably based on a process whereby the air pressure inside the expansion bellows 77 pressurizes what may be a membrane 79 (see FIG. 4a), which membrane is sealed off from the equalization chamber 39 and is rigidly braced on the inside and outside diameter, independently of the valve disc 29.

The very degressive damping force of the damping device 21 is preferably determined by the conical coil spring 27, and, within the first damping force family of characteristics 7, no additional forces are exerted on the valve disc 29. Only after the transition between the first damping force family of characteristics 7 and the damping force family of characteristics 13, does a pressure pad 45 come in contact with the membrane 79, which preferably acts via a control sleeve 49 to transmit the force to the valve disc 29, so that the rest of the stroke in the insertion direction of the piston rod 43 results in a sharply progressive damping force characteristic. There is preferably a pneumatic connection 81 on the expansion bellows 77 to regulate the level.

Figure 4A:
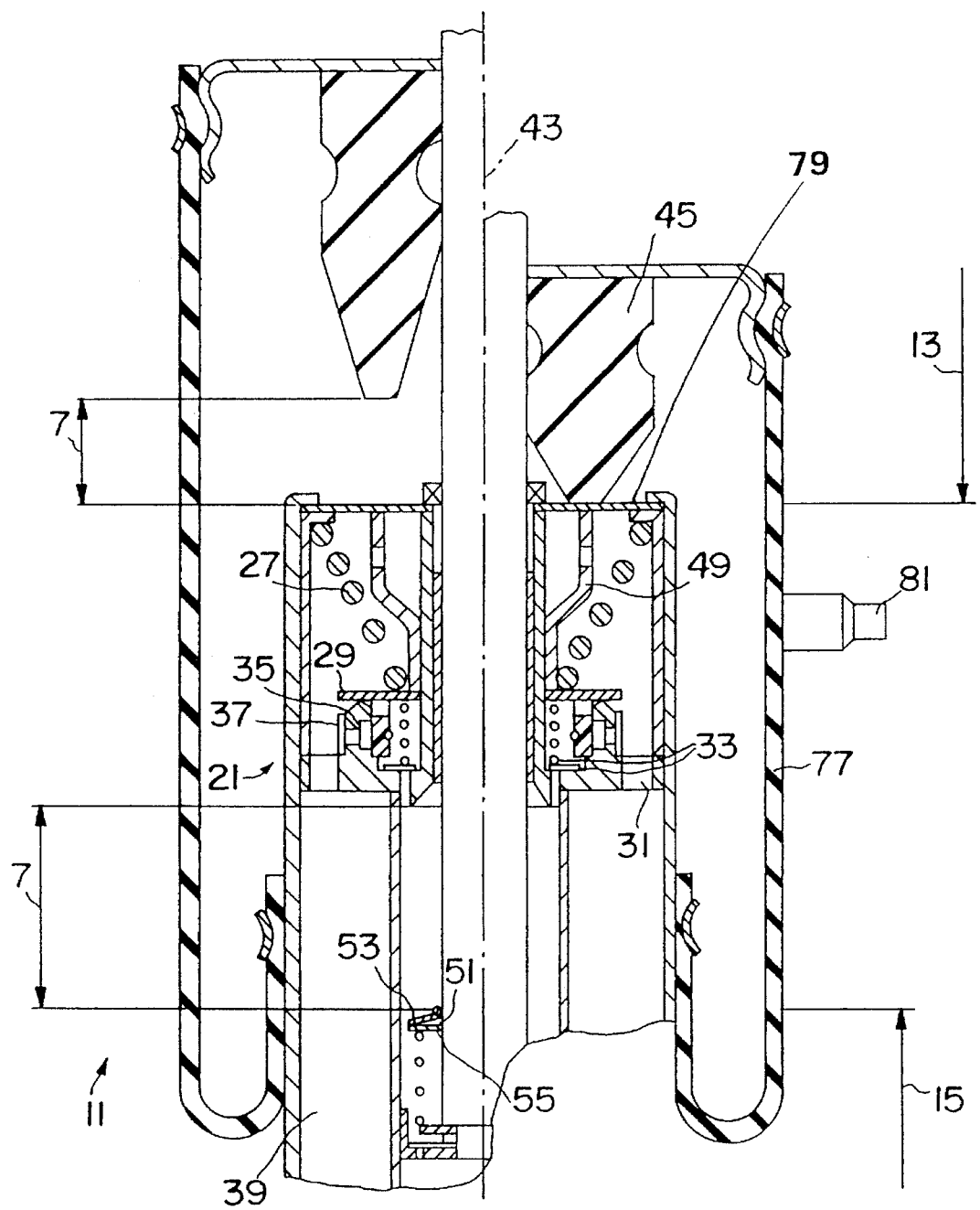
FIG. 4a is substantially the same view as FIG. 4, but more detailed.

Thus, as illustrated in FIGS. 4 and 4a, in accordance with a preferred embodiment of the present invention, pneumatic connection 81 is provided to regulate the level of air pressure within the bellows 77. Preferably, the damping force family of characteristics takes place via spring 27, similarly to the arrangement shown in FIGS. 2 and 2a. Additionally, damping force families of characteristics 13 and 15 also take place in a manner similar to that described with reference to FIGS. 2 and 2a.

It will be appreciated that, in each of the arrangements described above with reference to FIGS. 2, 2a, 3, 3a, 4 and 4a, the various parameters relating directly to the damping force families of characteristics 7, 13 and 15, such as spring constants, passage diameters, deflection ratios and the like, are preferably configured in such a way as to substantially optimally produce a desired damping force family of characteristics 1, with desired values, and generally has the shape shown in FIGS. 1 and 1a.

Figure 5:
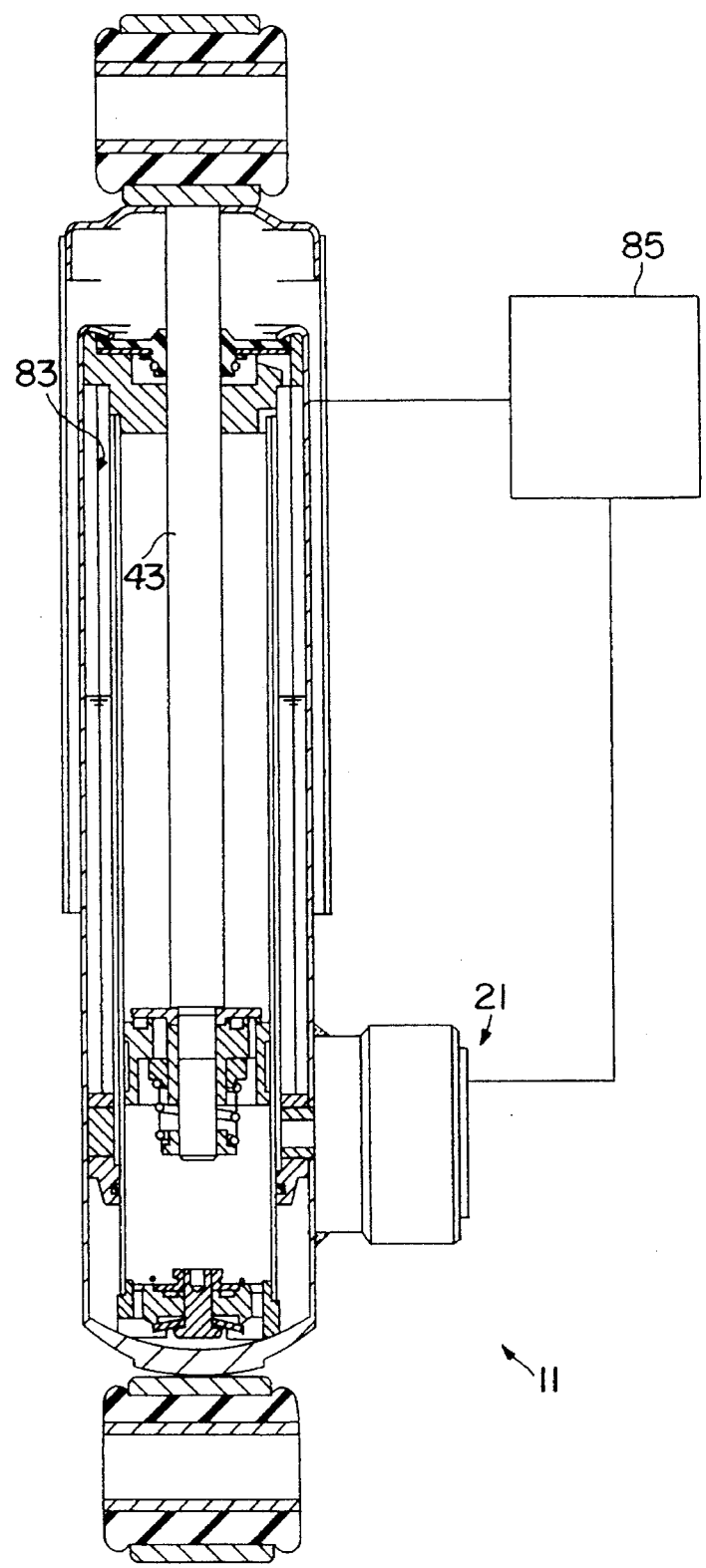
FIG. 5 illustrates a shock absorber with a continuously adjustable damping force.

FIG. 5 shows a shock absorber 11 with a damping force which can be adjusted by means of a damping device 21 connected in parallel. The basic structure of shock absorber 11 may be the same as that of other known shock absorbers, so that the description hereinbelow has been restricted to its essential features.

The shock absorber 11 may be equipped with a position detection device 83 which can sense the stroke length of the shock absorber 11. The signal generated by the position detection device 83 is transmitted to a computer 85 which has, among other things, the damping force family of characteristics 1 stored in its memory. A normal position 9 of the shock absorber 11 can be determined by means of the position detection device 83. For example, after the vehicle ignition is turned on, the signal from the position detection device 83 could be defined as the reference signal. The position of the first damping force family of characteristics 7 is thus clearly and very easily determined.

The stroke length for the first damping force family of characteristics 7 is also preferably stored in the computer's memory. If a signal is transmitted to the computer by the position detection device 83 which corresponds to a stroke position outside the first damping force family of characteristics 7, then there is preferably a continuous transition from the softening damping force setting, independent of the stroke direction, to a harder damping force setting of the damping device 21. The desired progressive damping force curve within the harder damping force setting can be very easily realized by continuously sensing the stroke position, and by hardening the damping force setting as the shock absorber approaches its limit positions.

It should be understood that the arrangement illustrated in FIG. 5 could conceivably be utilized in accordance with other embodiments of the present invention. In this respect, it is conceivable, for example, to use the arrangement of FIG. 5 as a supplement to other embodiments of the present invention, wherein damping device 21 would conceivably provide additional damping, or to use the arrangement of FIG. 5 as the sole means for determining one or more of the damping force families of characteristics 7, 13 and 15. In the latter example, the arrangement of FIG. 5 could be used, for example, to provide the damping force families of characteristics 13 and 15, while mechanical arrangements found in other embodiments of the present invention could essentially provide the damping force family of characteristics 7.

Figure 6:
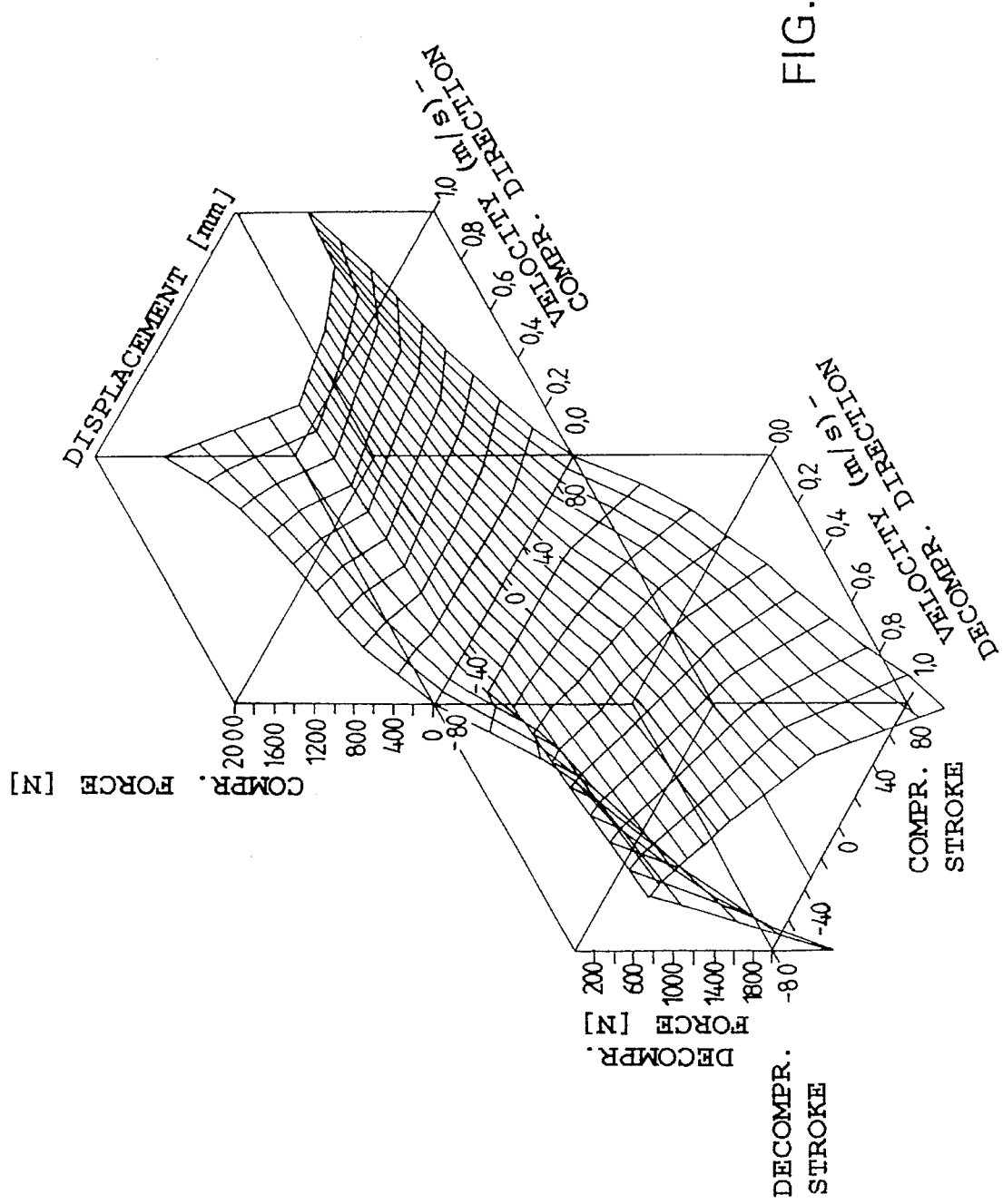

FIG. 6 is a three-dimensional performance-related graph illustrating a damping force family of characteristics 1 in accordance with the present invention. In FIG. 6, axes for displacement, velocity, and damping force are shown.

Figure 7:
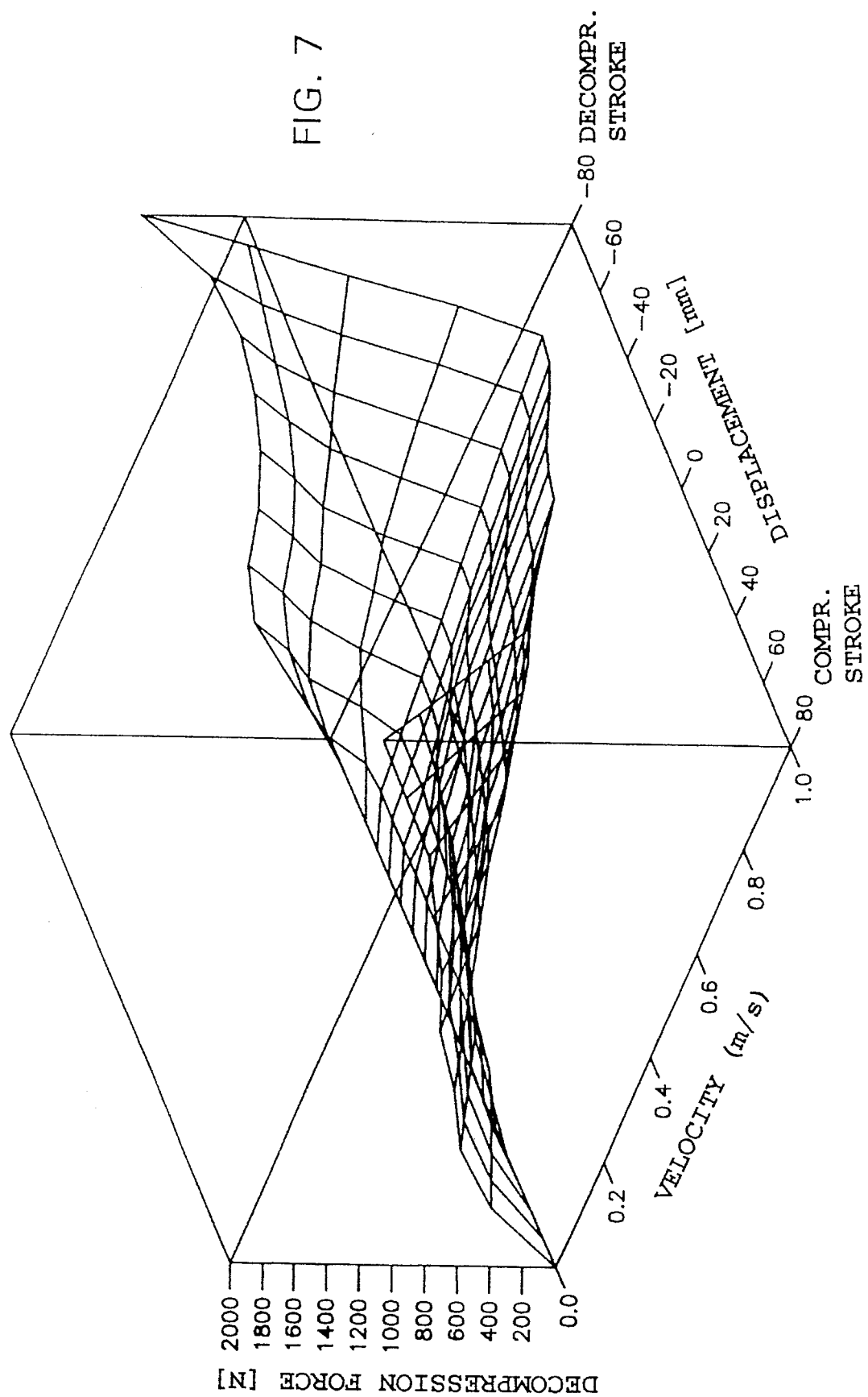

FIG. 7 represents, in three dimensions, that portion of the graph of FIG. 6 corresponding to the presence of a decompressive force.

Figure 8:
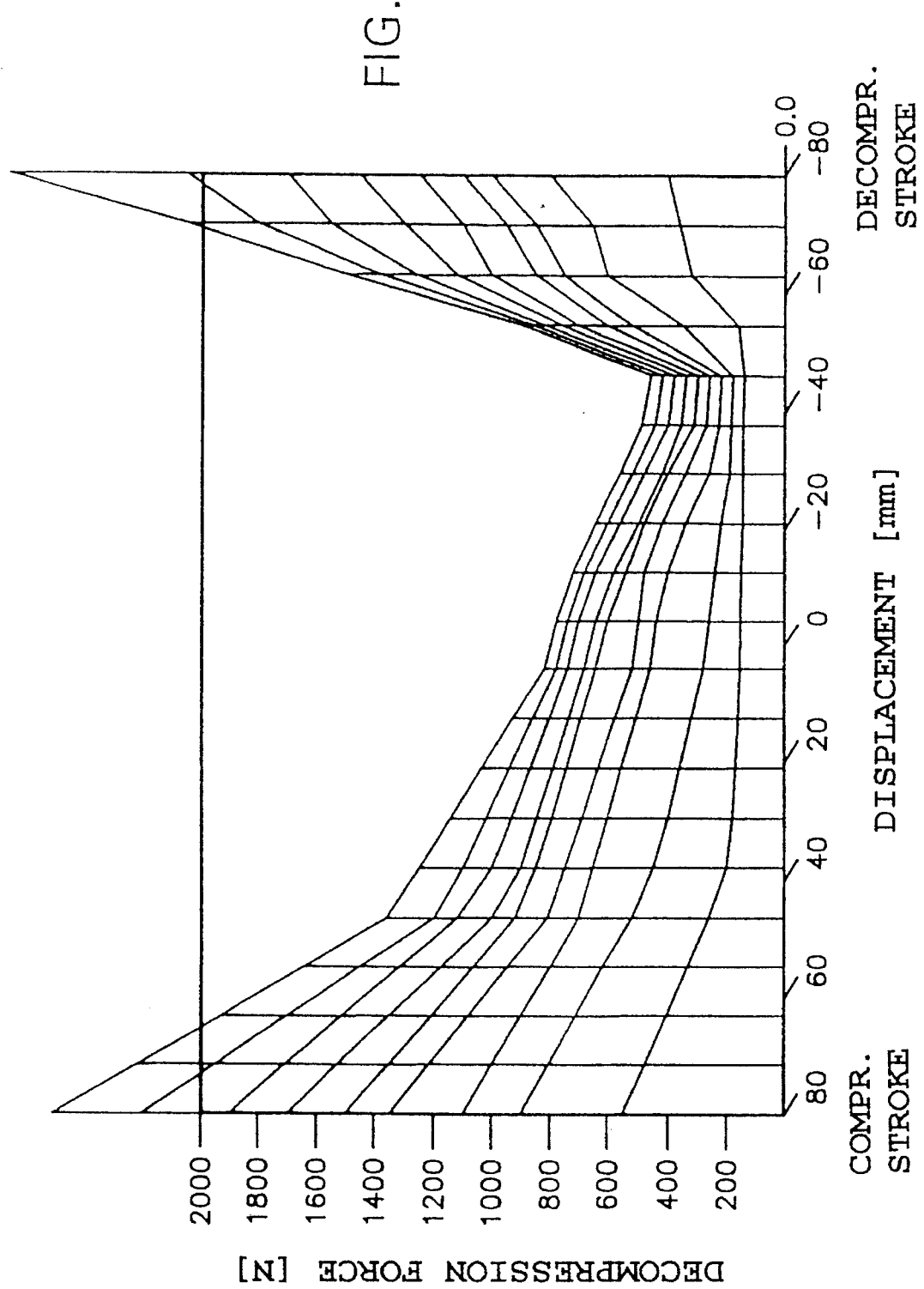

FIG. 8 is a two-dimensional representation of a portion of FIG. 7, showing displacement versus decompression force.

Figure 9:
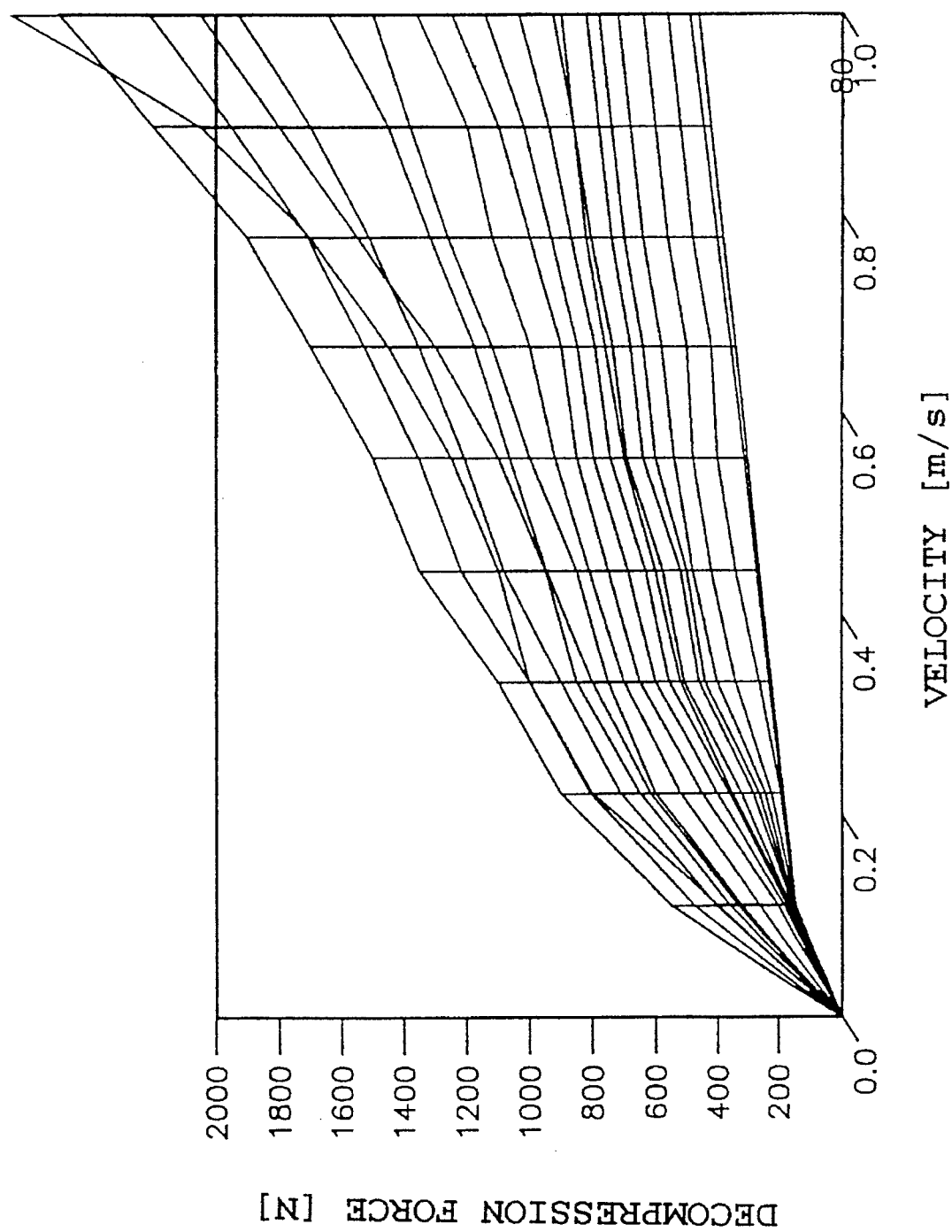

FIG. 9 is also a two-dimensional representation of a portion of FIG. 7, but showing velocity versus decompression force.

Figure 10:
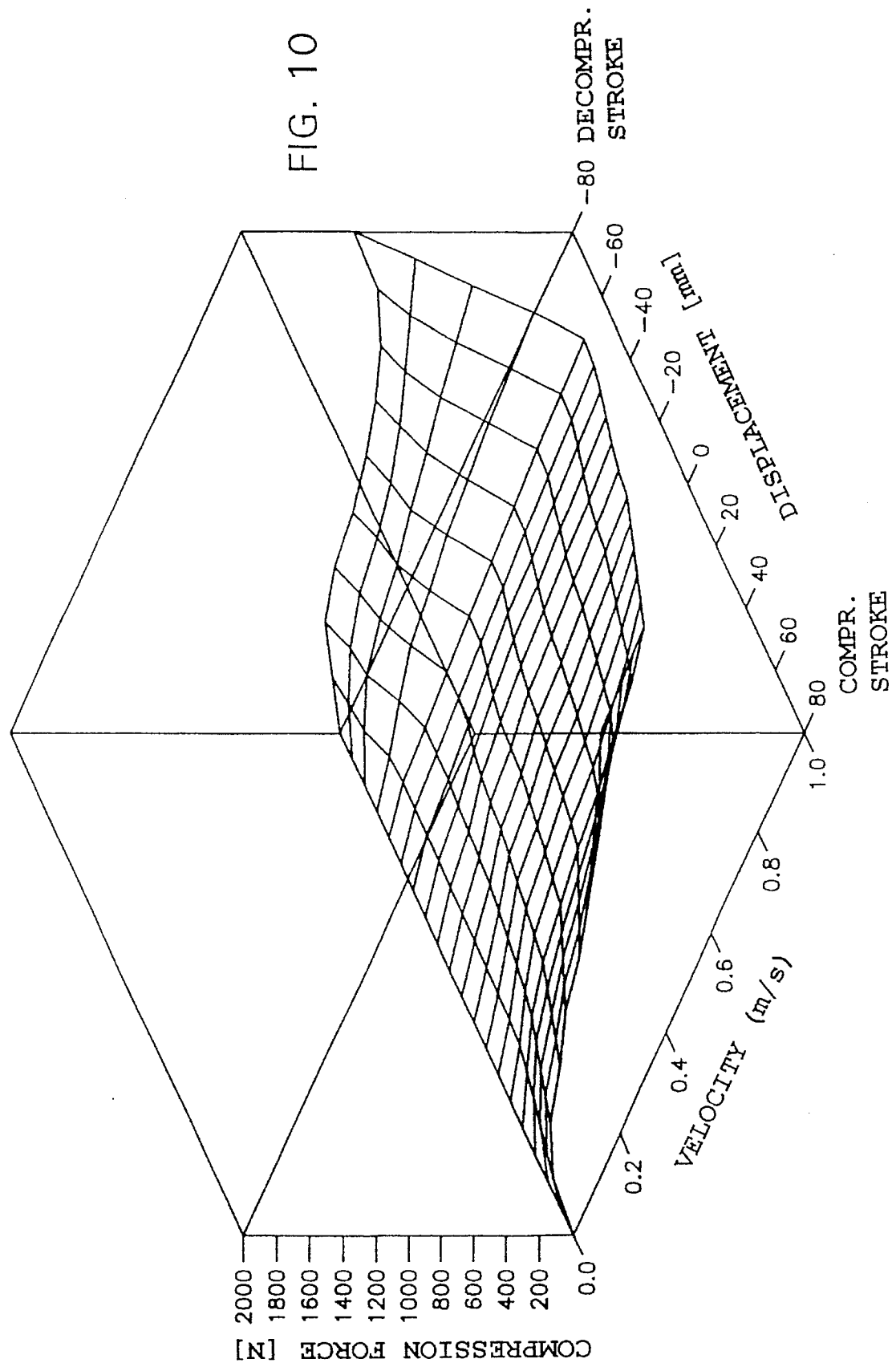

FIG. 10 represents, in three dimensions, that portion of the graph of FIG. 6 corresponding to the presence of a compressive force.

Figure 11:
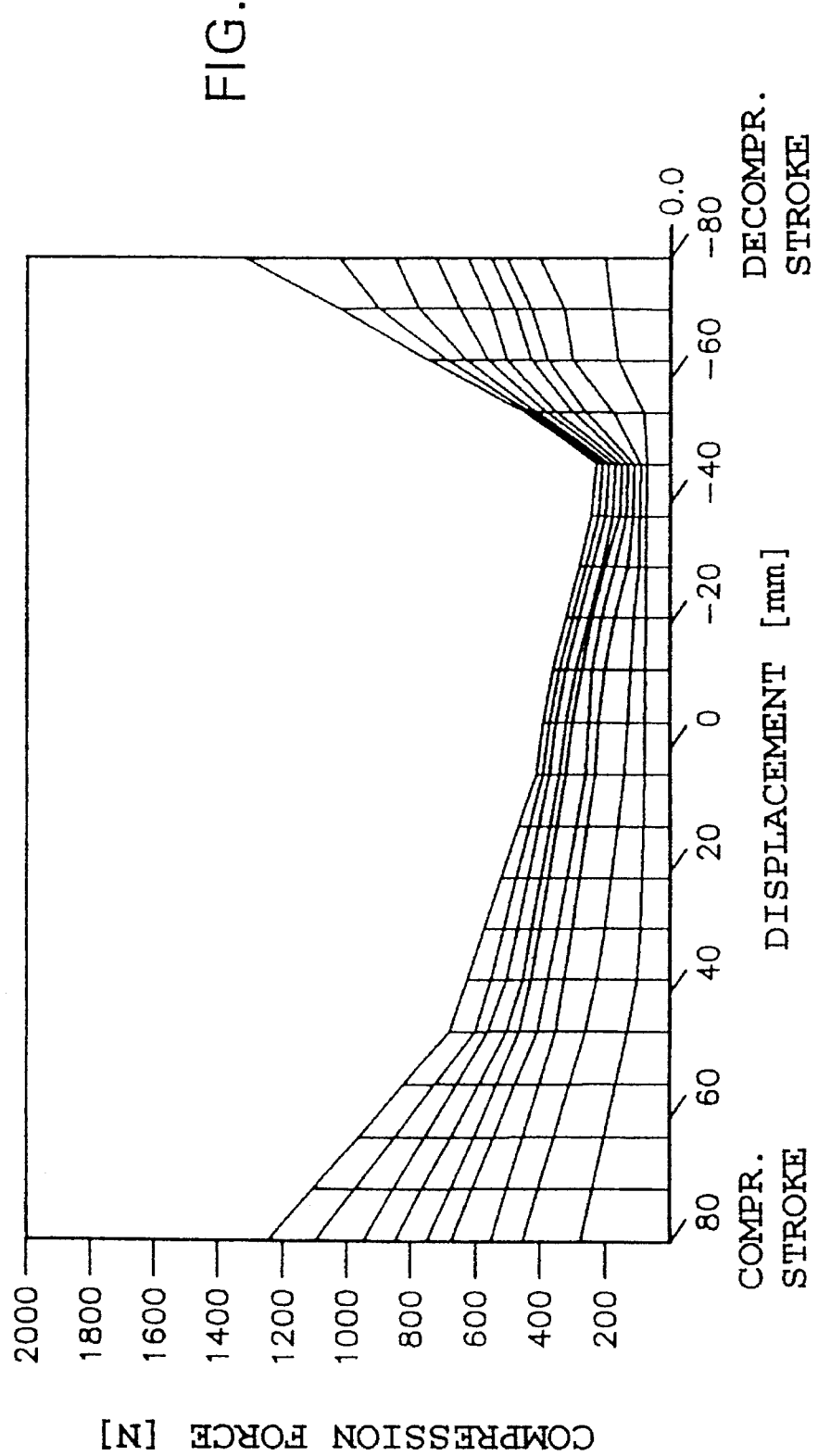

FIG. 11 is a two-dimensional representation of a portion of FIG. 10, showing displacement versus compression force.

FIGS. 12a–12h, 13, 14a–14e, 15 and 16 illustrate alternative embodiments of the present invention.

Figure 12A:
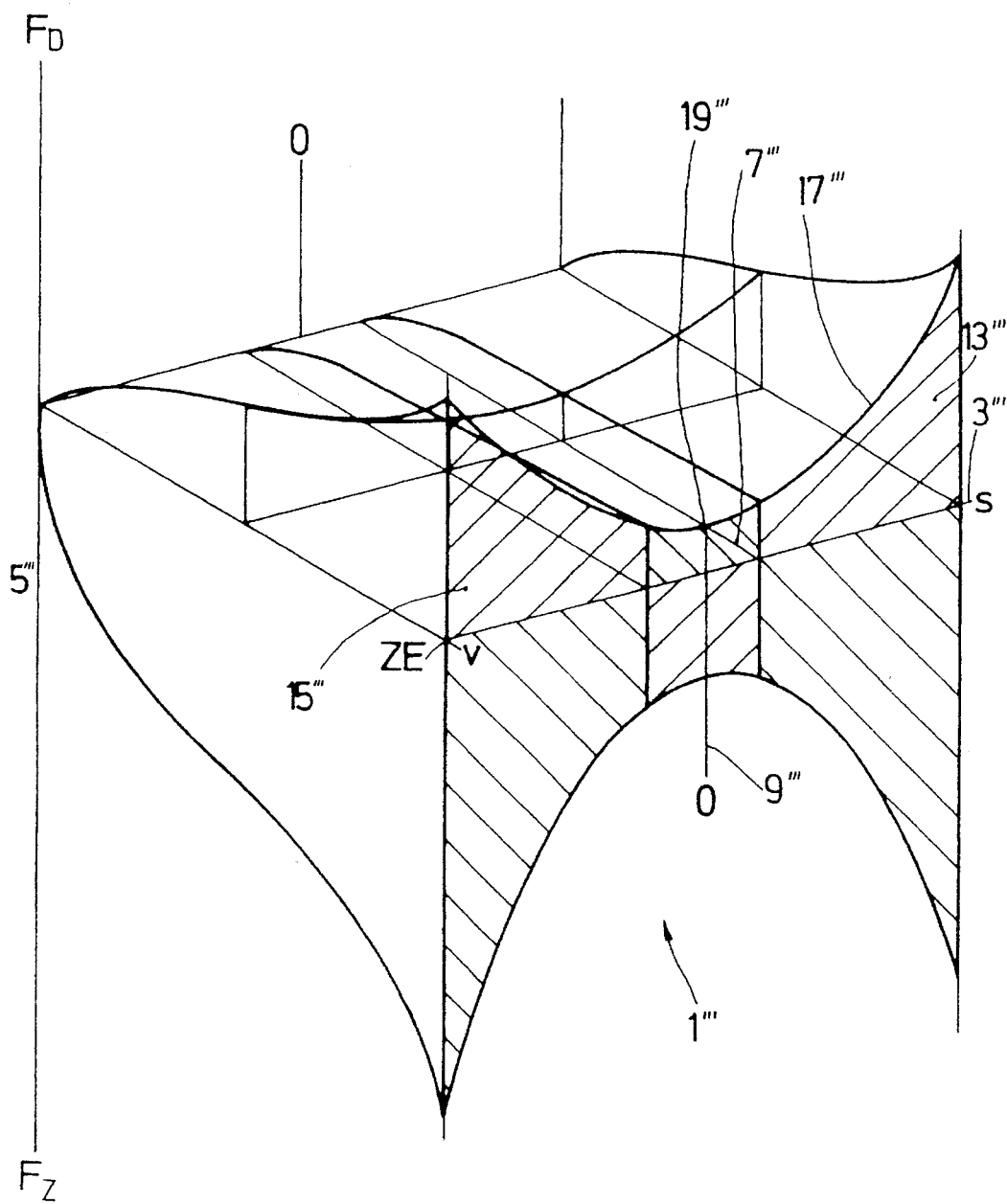

FIG. 12a shows a damping force family of characteristics 1''', which is plotted as a function of the stroke (s-axis) 3''' and velocity (v-axis). In terms of the stroke, the damping force family of characteristics 1''' is divided into at least 3 individual damping force families of characteristics. A first damping force family of characteristics 7''' lies in the range of the normal stroke position 9''' of a shock absorber 11'''. The maximum stroke range of the first damping force family of characteristics 7''' is restricted to approximately the spring deflection which is transmitted by one tire to the shock absorber, when the car is travelling over a manhole cover or cobblestone streets. The minimum stroke range is approximately on the order of the roughness of the road. Adjacent to the first damping force family of characteristics are the damping force families of characteristics 13''' and 15''' which are employed when a larger spring deflection is required.

In relation to the velocity axis, the first damping force family of characteristics has a very degressive damping force characteristic, with a correspondingly low damping force peak at the maximum spring deflection velocity. The damping force families of characteristics have a damping force curve which, at relatively low velocities and/or in the vicinity of the first damping force family of characteristics, has a degressive damping force behavior, but one which, with increasing spring deflection velocity in the stroke range near the limit positions of the shock absorber, assumes a sharply progressive damping force behavior.

The damping force family of characteristics 1''' can be realized particularly well in a level-controlled shock absorber, since the normal stroke position (9''') of the shock absorber, regardless of the load status of the vehicle, can always be kept in the first damping force family of characteristics 7'''. Alternatively, of course, it is also possible to design the damping force family of characteristics 1''' as a function of the load. The bottom 19''' of the curve of the damping force characteristic 17''' would be shifted in the decompression direction (ZE).

Figure 12B:
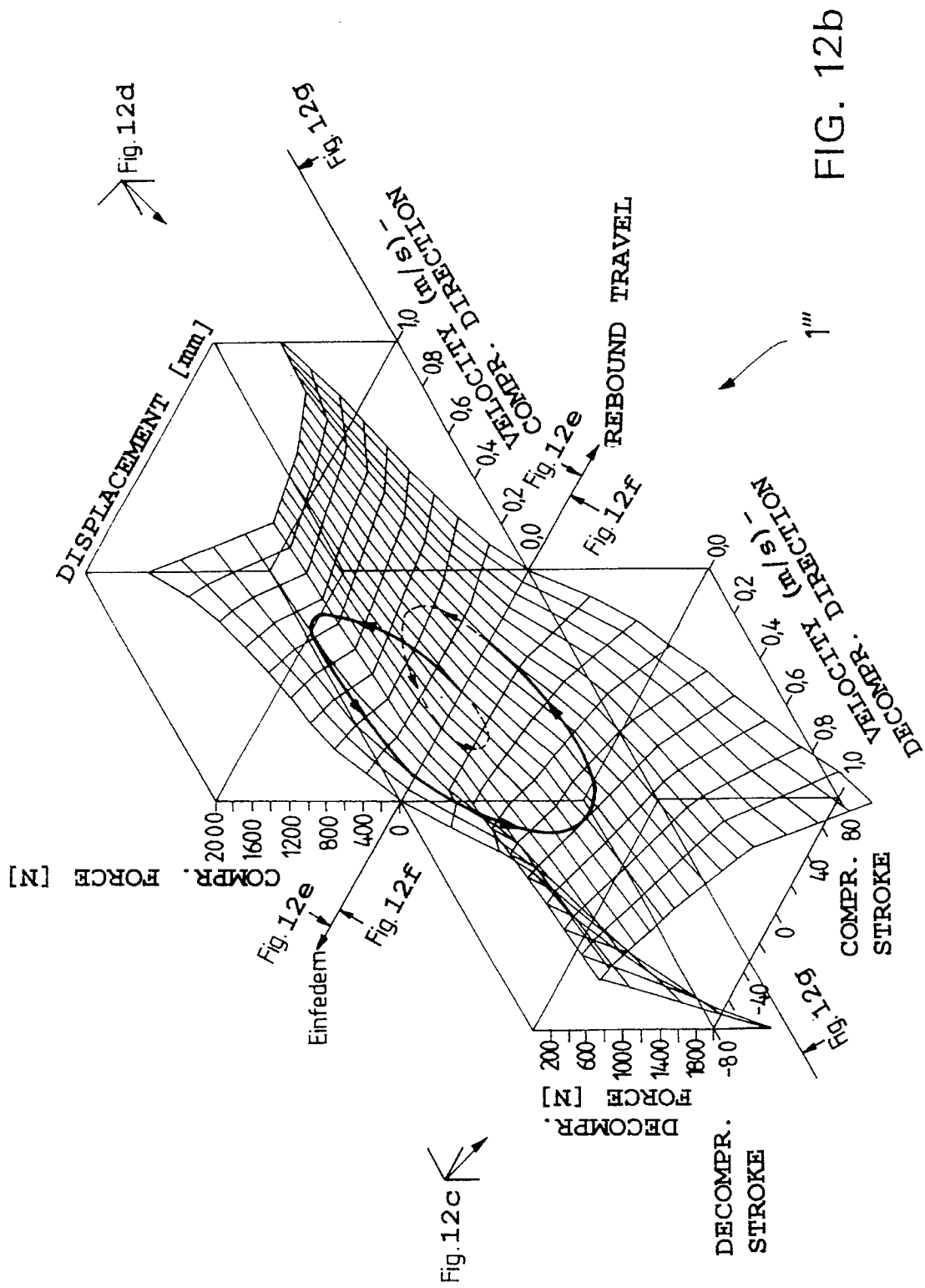
Figure 12C:
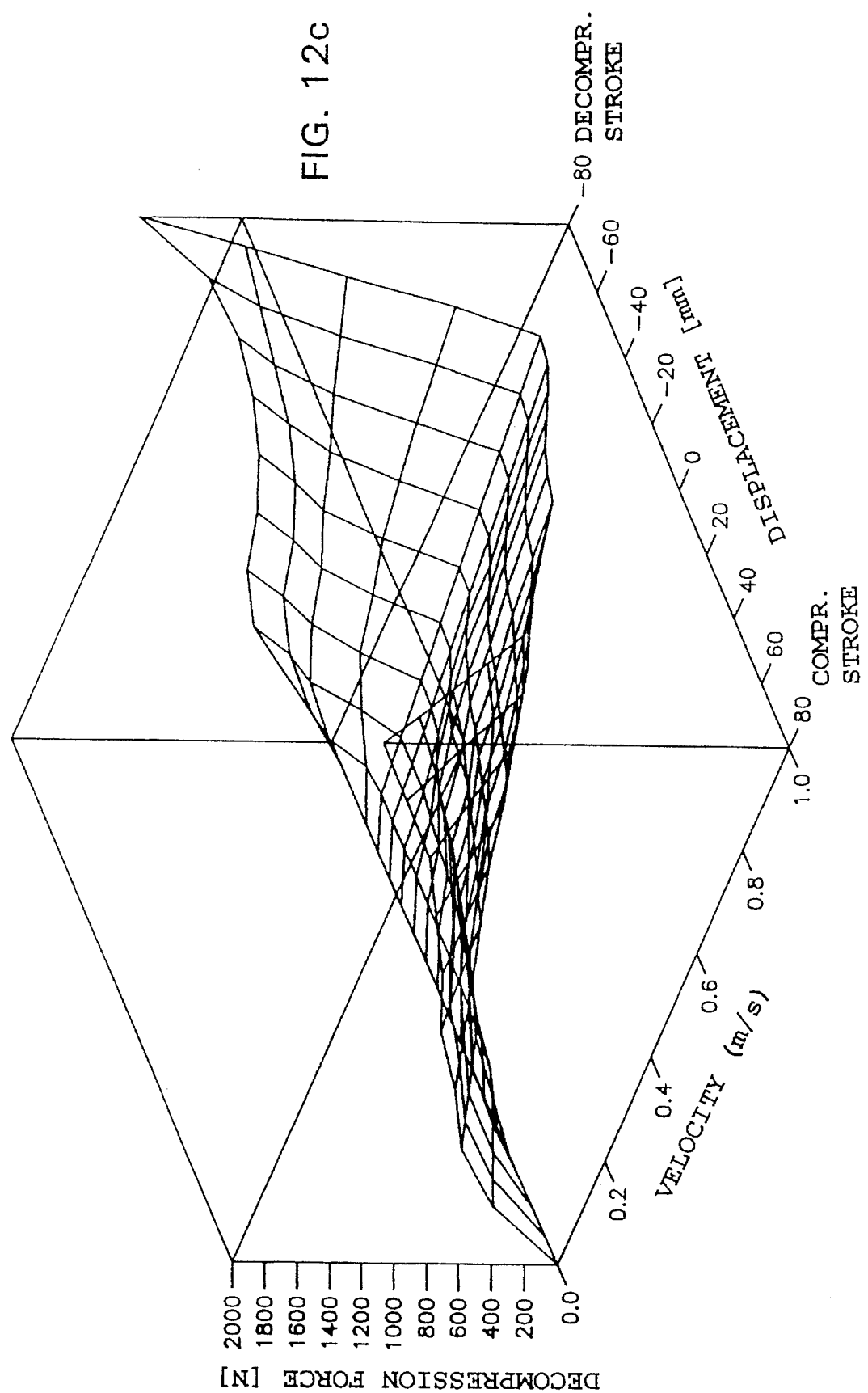
Figure 12D:
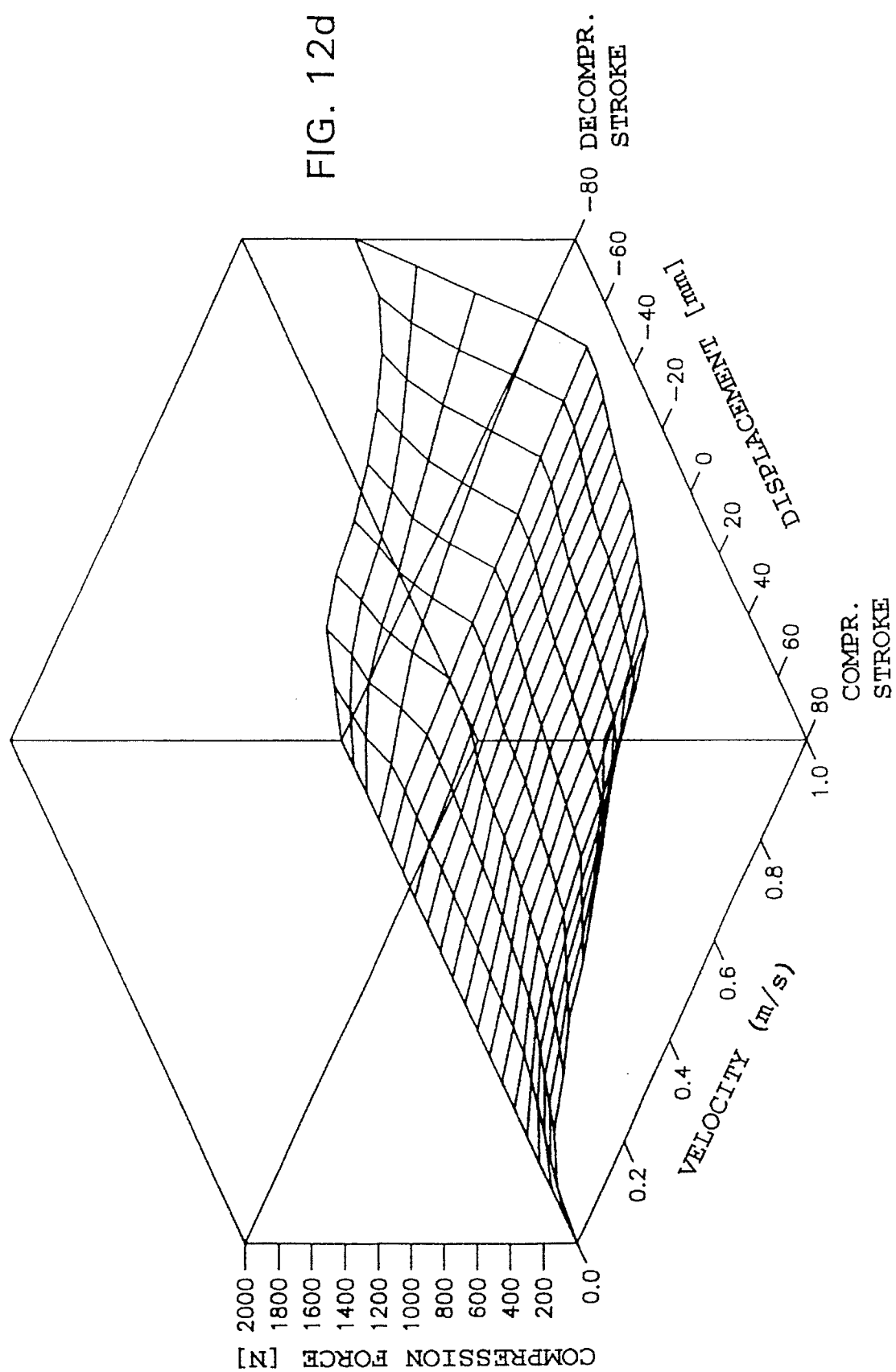
Figure 12E:
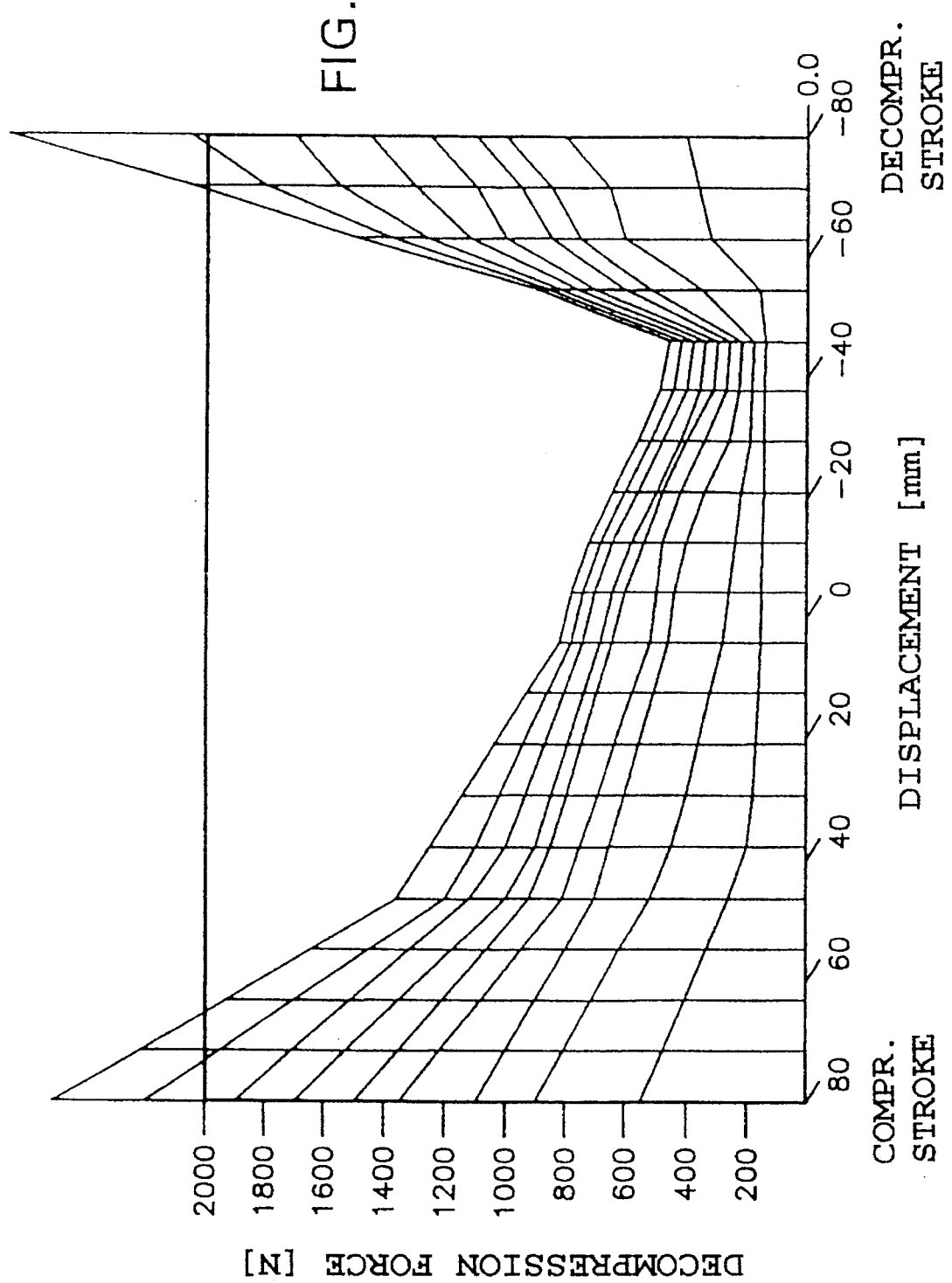
Figure 12F:
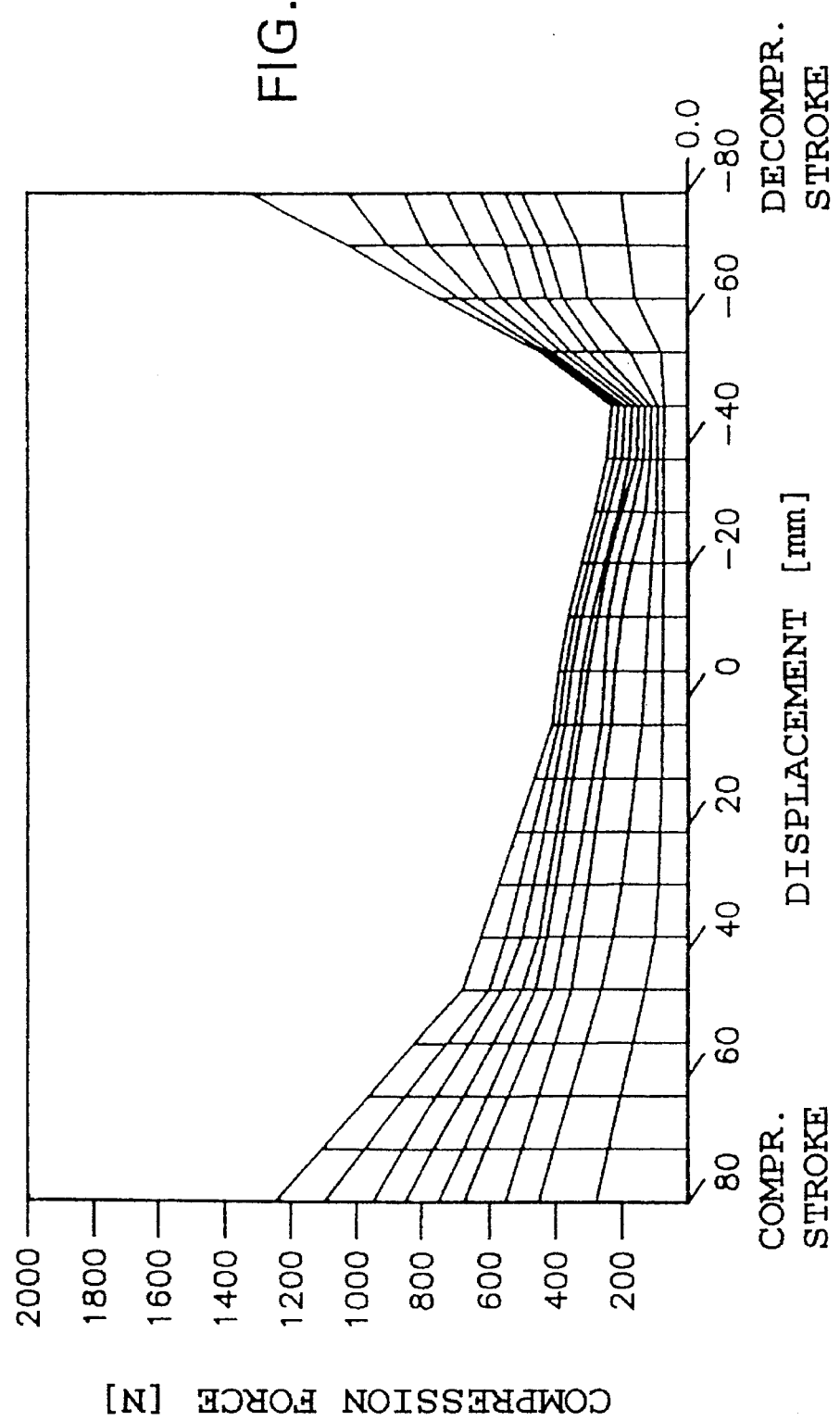

FIGS. 12b to 12h show the family of characteristics or projections of the family of characteristics 1'''. FIG. 12b shows clearly that only a small damping force is generated in the vicinity of the shock absorber distance 0 or of the normal position of the vehicle, which increases sharply toward the extreme stroke positions in the decompression direction and in the compression direction.

Figure 12G:
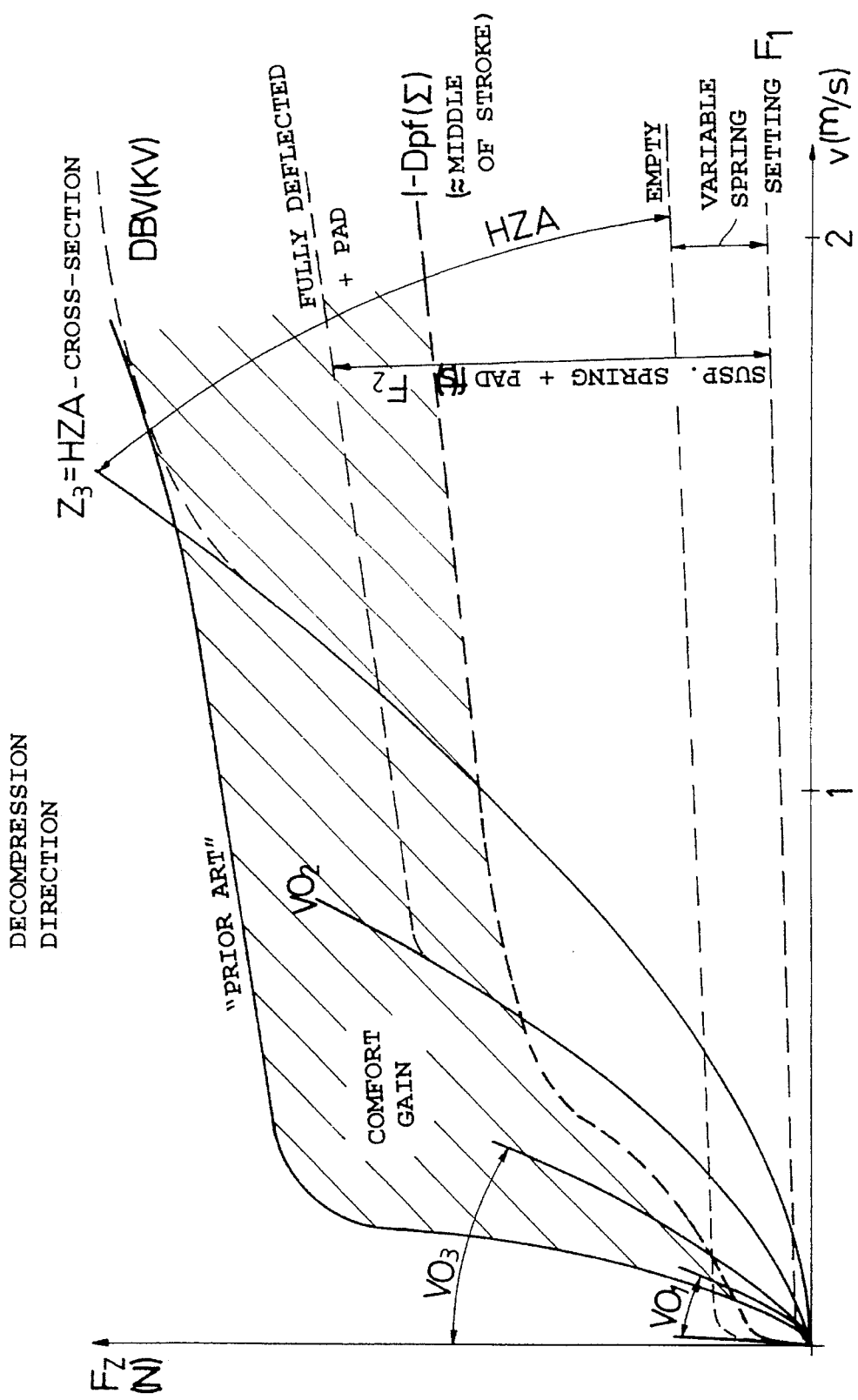

FIG. 12g shows a damping force velocity graph in the decompression direction of the family of characteristics. At a velocity of V0, there is predominantly an advance opening cross section VO1, which is designed to prevent the rumbling of the shock absorber. Additively superimposed are advance opening cross sections VO2 and VO3. A spring force F1 of a valve V1 limits the damping action of the advance opening cross section VO1 above a specified velocity V, so that the advance opening cross sections VO2 and VO3 then primarily determine the damping force characteristic, until the maximum force F2 of a valve V2 is reached. Then a hydraulic-mechanical decompression stop HZA is engaged, the action of which is controlled by a pressure relief valve DBV above a specified pressure level. The damping force characteristic indicated in broken lines stands for a medium load status of the vehicle. Compared to the solid line, which corresponds to the series condition under the same boundary conditions, the hatch-marked surface area represents the attainable gain in comfort for this load condition.

Figure 12H:
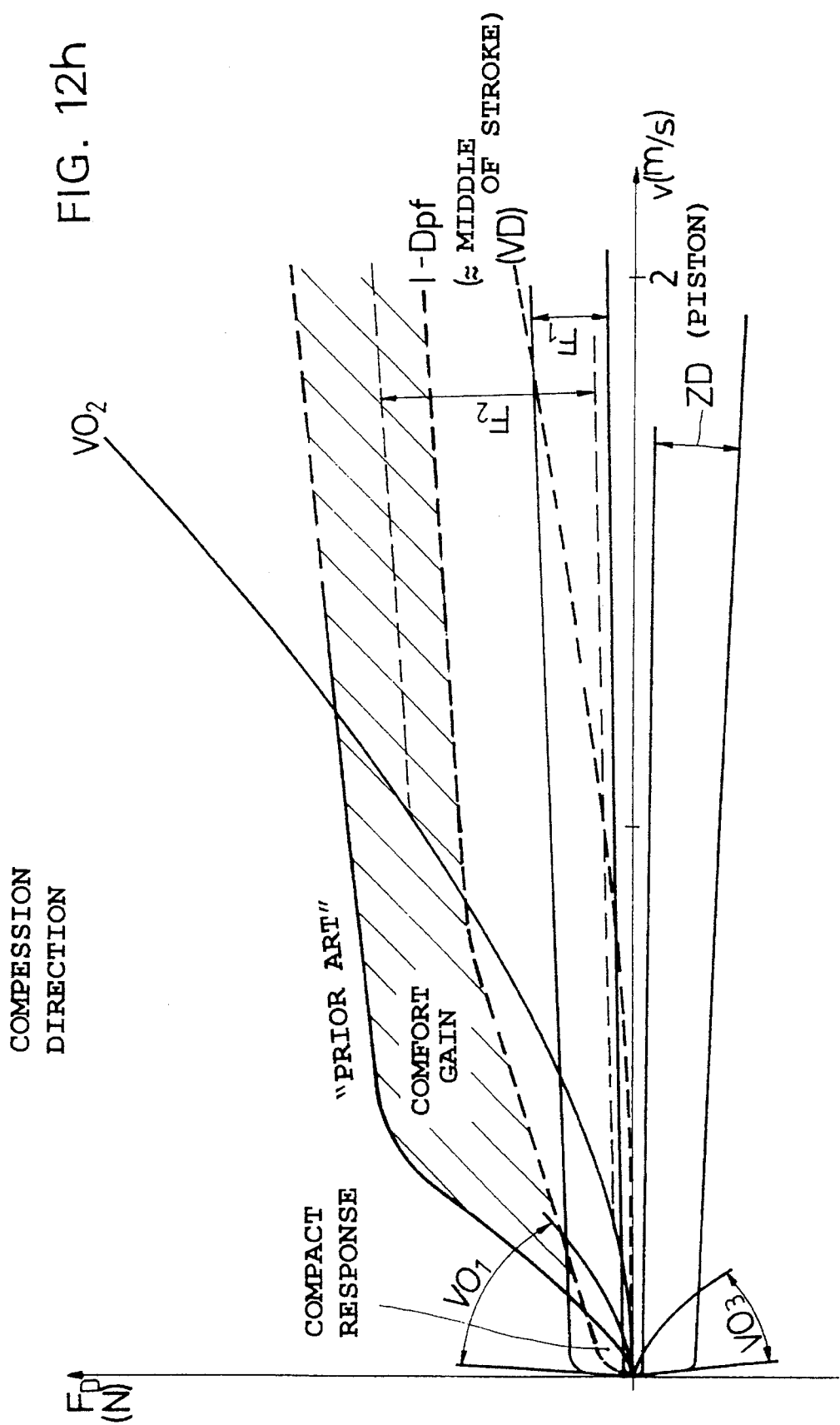

The corresponding portion of the description relating to FIG. 12g can also be applied to FIG. 12h. In contrast to FIG. 12g, however, it should be noted that no pressure relief valve counteracts a hydraulic pressure stop HDA. Moreover, the influence of the advance opening VO3 and an additional damping force ZD is also apparent, which can be applied to adjust the decompression/compression ratio. The gain in comfort under the same boundary conditions is also shown.

Figure 13:
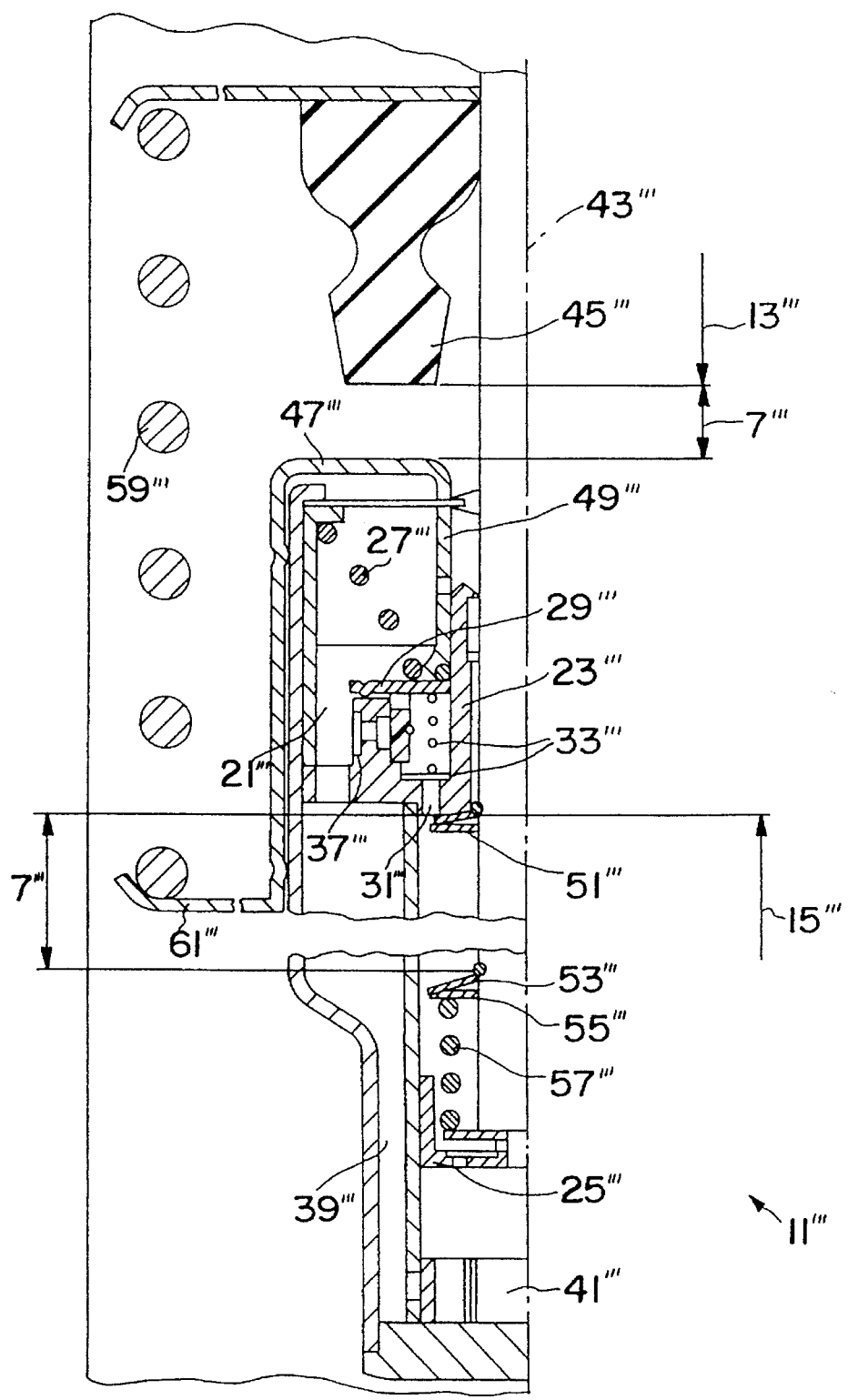

FIG. 13 shows one possible embodiment of a shock absorber 11''', which realizes a damping force family of characteristics with a shifted bottom 19''' of the curve. The damper is realized in the form of a spring strut, whereby there is a damping force device 21''' in the upper end region of the shock absorber 11''' inside a piston rod 23'''. The damping device 21''' transmits the flow in only one direction, so that the same damping force can be exerted in the decompression and in the compression direction, since the piston valve 25''' is designed as a non-return valve. The basic damping force of the valve V2 is generated, among other things, by a very weak conical spring 27''', corresponding to F2, which presses a valve disc 29''' onto a valve seat. The displaced damping medium flows through the piston rod guide 23''' through an inflow passage 31''' (VD), which is equipped with a check valve 33''' (V1, F1, VO1). A discharge passage 35''', which also has a check valve 37''', forms the connection to an equalization chamber 39'''. The equalization chamber is connected by means of a check valve 41''' in the form of an elastic slotted ring (VO2) to the working chamber.

When the spring is deflected, a piston rod 43''' is inserted into the shock absorber 11'''. The damping medium flows through the damping device 21''' and reaches the equalization chamber 39'''. Within the spring deflection in the insertion direction, between a compression pad 45''' and a stop surface 47''' of a control sleeve 49''', starting from the deflection point at which a hydraulic-mechanical decompression stop 51''' has just been tripped, the damping force family of characteristics 7''' is located, and has a basic damping force which is defined by the conical coil spring 27'''. For the remainder of the spring deflection, the pressure pad 45''' presses against the control sleeve 49''' and thereby increases the pre-stress on the valve disc 29'''. This spring deflection is in the damping force family of characteristics 13'''. In the reverse deflection direction, when the hydraulic-mechanical decompression stop 51''' consisting of a disc 55''' braced between a spring plate 53 ''' and a coil spring 57''', together with the piston rod 43''' has reached the inflow channel 31''' on the piston rod guide 23''', the damping force family of characteristics 15''' begins, whereby the spring plate, by interacting with the disc 55''', reduces the cross section of the inflow channel 31''' and thus allows the damping force to increase.

The basic setting of the damping force generated by the conical coil spring 27''' can be superimposed in an additive manner on a vehicle suspension spring 59''' (F2), since the plate spring 61''' transmits the spring force to the control sleeve 49'''. With this measure, the shock absorber can be load-controlled, and thus the position of the damping force characteristic trough 19''' can be shifted in the decompression direction.

Figure 14A:
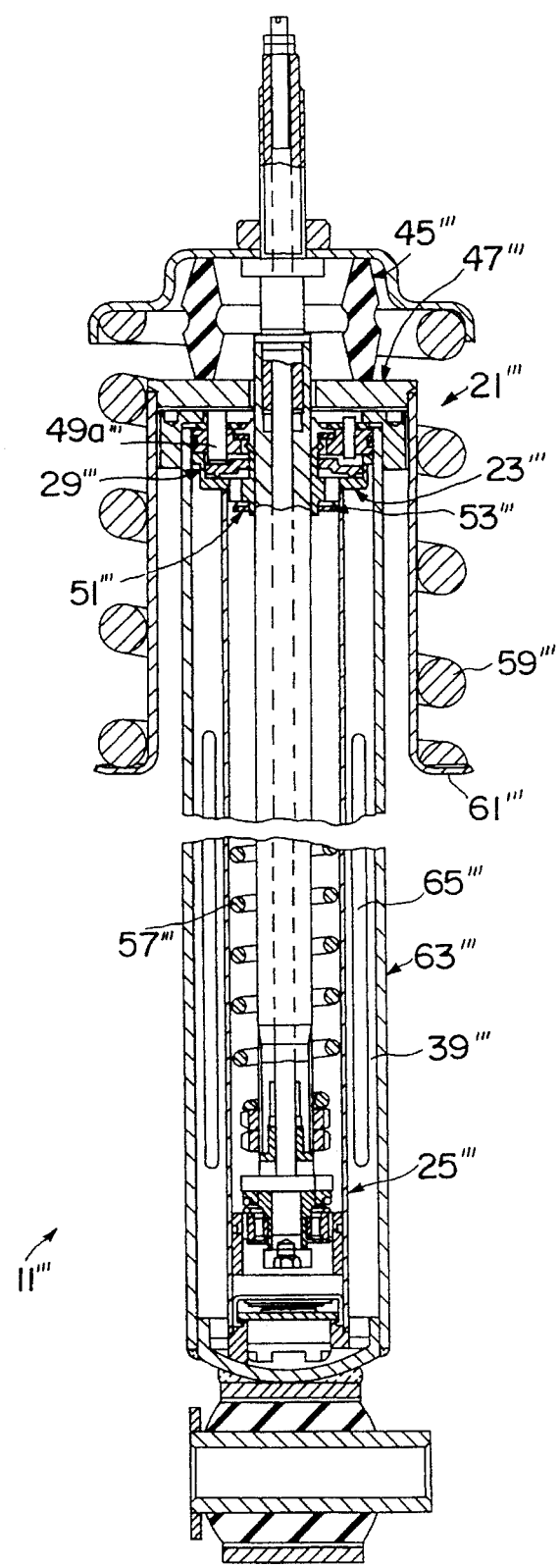

FIG. 14a shows a section through a shock absorber, the essential structure of which is the same as the model illustrated in FIG. 13. One difference is that a sealed cylinder 63''' which is adjacent to the equalization chamber 39''' is designed so that it has a constant cross section, and so that it occupies no more space than a corresponding standard shock absorber. Instead of a control sleeve 49''', control pins 49a''' are used, which are actuated by the vehicle suspension spring 59''' or the pressure pad 45''' by means of the stop surfaces 47''', whereby the valve function is influenced by the valve disc 29'''. So that the connection between the discharge passage and the equalization chamber 39''' is always filled with damping medium, a gas pocket 65''' is located inside the equalization chamber, so that no foaming effects can occur. Thus all the check valves in the piston rod guide can be eliminated.

The shock absorber 11''' also has a hydraulic decompression stop (HZA) 51''' corresponding to the description of FIG. 13. The hydraulic decompression stop is actuated by the coil spring 57'''. The spring length of the coil spring and the spring constants of the plate springs 53''' and of the coil spring 57''' can thereby be used to tune the application point of the hydraulic decompression stop. For example, if a rather soft plate spring is used, which has a lower spring constant than the coil spring 57''', the hydraulic decompression stop acts first, before the mechanical stop is engaged by means of the coil spring.

As shown in FIG. 14b, there are a series of possibilities for the adaptation of the shock absorber to a specified vehicle. For example, when a standard piston rod guide is used, a pre-throttle VD can be realized by means of a pre-throttle disc 67'''. The pre-throttle cross section can be set by the selection of the outside diameter of the pre-throttle disc 67'''. The load-dependent valve V2 can be designed as a function of the spring stiffness of the spring F2, i.e. of the vehicle suspension spring 59''' (FIG. 14a), as well as of a corresponding advance opening cross section VO2. For the load-dependent damping valve, the damping force characteristic can be adapted to the requirements by means of the contact circle of the valve disc 29''', as well as a slotted disc 29a''' which determines the advance opening cross section. The slot widths multiplied by the thickness of the slotted disc 29a''' thereby form the advance opening VO2.

The advance opening cross section VO1 is determined by an advance opening disc 69''' separate from the slotted disc 29a''', and which is prestressed by a valve spring 71'''. The advance opening disc 69''' and the valve disc 71''' form the load-independent valve V1.

Figure 14C:
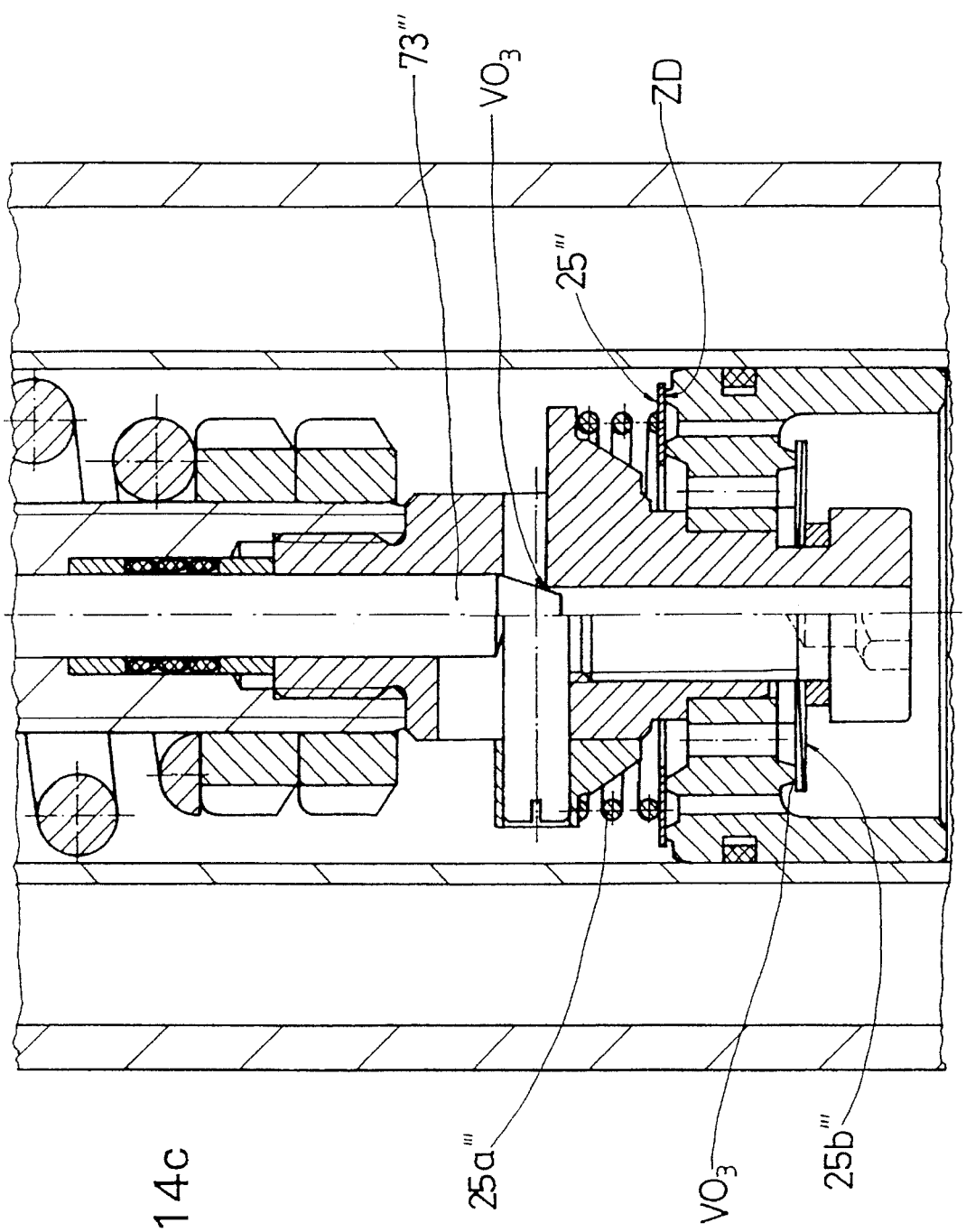

FIG. 14c illustrates the piston of the shock absorber 11'''. In the compression direction, a check valve 25''' acts, which in this variant can be adjusted by means of a piston rod 73''' in terms of its opening action. It is thereby possible that the check valve 25''' can generate an additional damping force ZD in the compression direction by means of its closing spring 25a'''. Alternatively, as shown in the right half of the piston, a third advance opening cross section VO3 can be influenced by the control rod 73''', in contrast to which, on the left half of the piston, a constant advance opening VO3 is executed in the context of a pressure relief valve DBV 25b''', in which there is a slot in the valve seat or a valve disc provided with recesses inside the pressure relief valve. The pressure relief valve 25b''' consists of at least one valve disc which, above a specified pressure level, opens a connection between the working chamber on the piston rod side and the working chamber away from the piston rod. The pressure relief valve 25b''' thereby trims the damping action of the hydraulic decompression stop. The advance opening VO3 is used, among other things, to influence the adaptation of the decompression and compression damping on specified shock absorber sizes.

Figure 14D:
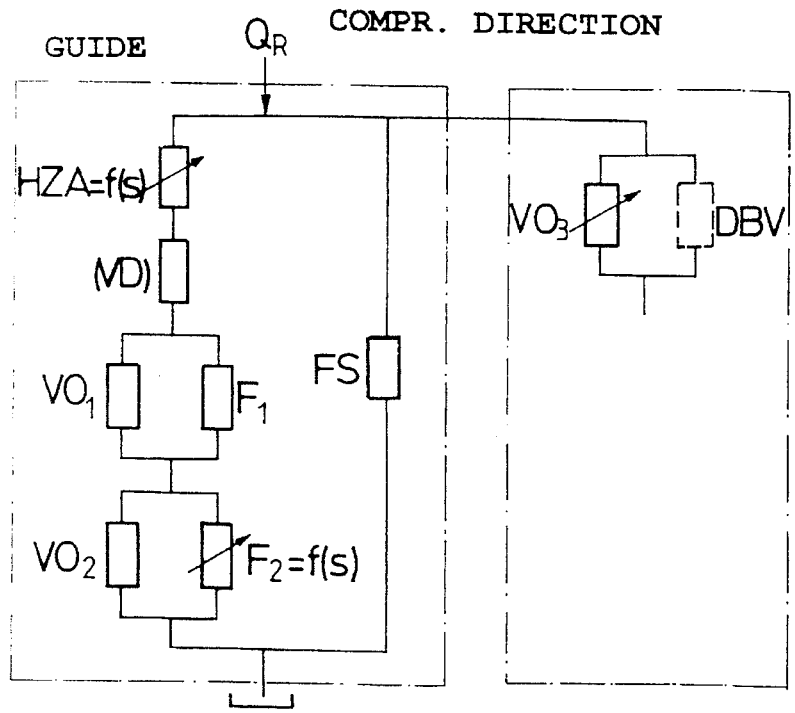
Figure 14E:
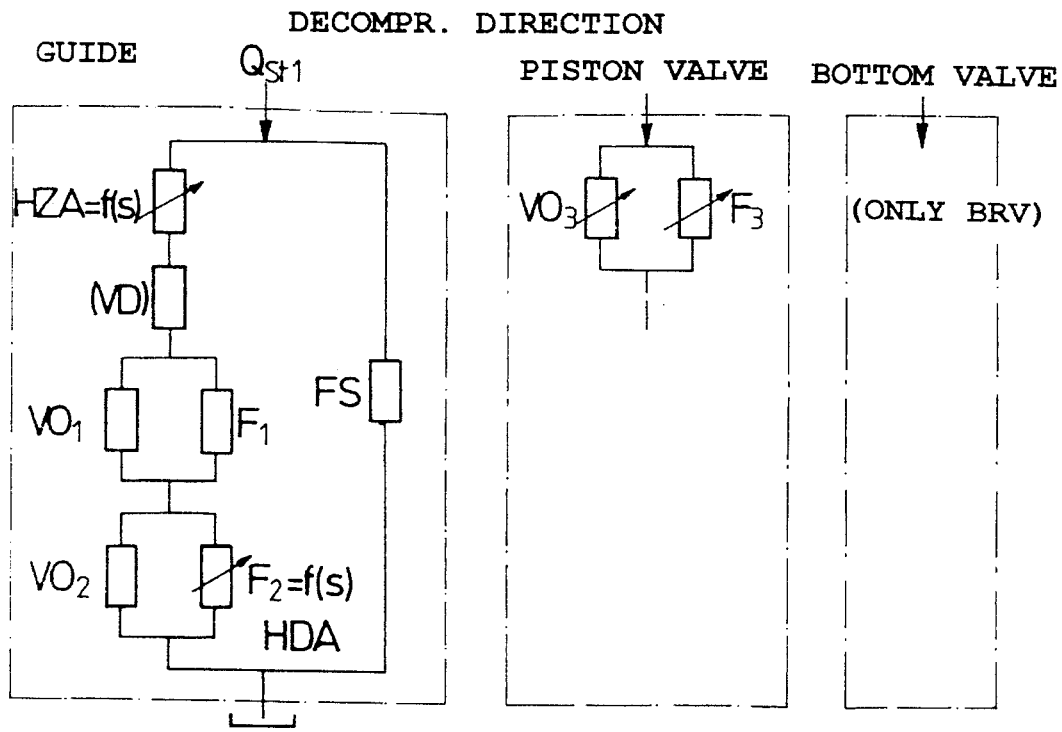

FIGS. 14d to 14e show the equivalent circuit diagrams for the shock absorbers described above. In the decompression direction (14d), the volume current QR, the volume of which corresponds to the piston-rod-side annulus, is divided into two currents. It is thereby assumed that the stroke position is in the position in which the hydraulic decompression stop is just engaged. As also described above, the action of the hydraulic decompression stop is a function of the stroke position, and therefore HZA=f (s). There can be—although there need not necessarily be—an advance opening VD, which is designed in the form of an inserted disc. Then the advance opening cross section VO1 becomes active with a spring prestress F1, which is followed by the advance opening VO2 with the spring prestress. The setting of F2 is done by means of the vehicle suspension spring 59'''. The guide gap FS between the piston rod and the piston rod guide simultaneously acts on the main current.

On the piston rod side, the advance opening cross section VO3, which in the illustrated embodiment is either constant an adjustable, parallel to the main current. Under favorable conditions, and under some circumstances, it is even possible to omit an advance opening VO3. A pressure relief valve DBV is connected parallel to the entire main current through the piston rod guide, and connects the two working chambers to one another in the event of peak pressures.

Because the volume current also flows through the valves of the piston rod guide in the compression direction, the main current, corresponding to the piston rod volume to be displaced QSt1, is very similar to the decompression direction. In the compression direction, the pressure pad also acts on the load-dependent valve V2 with the spring force F2 as a hydraulic compression stop HDA. The volume of the working chamber on the side away from the piston rod acts on VO3 with the spring F3, so that the damping forces of the damping valves in the piston rod guide and the piston are superimposed additively. This description applies to the case where a simple check valve BRV is used as the bottom valve. With a specified shock absorber size (cylinder area, piston rod area), the use of a bottom valve with damping valves can vary the ratio of decompression to compression damping.

Figure 15:
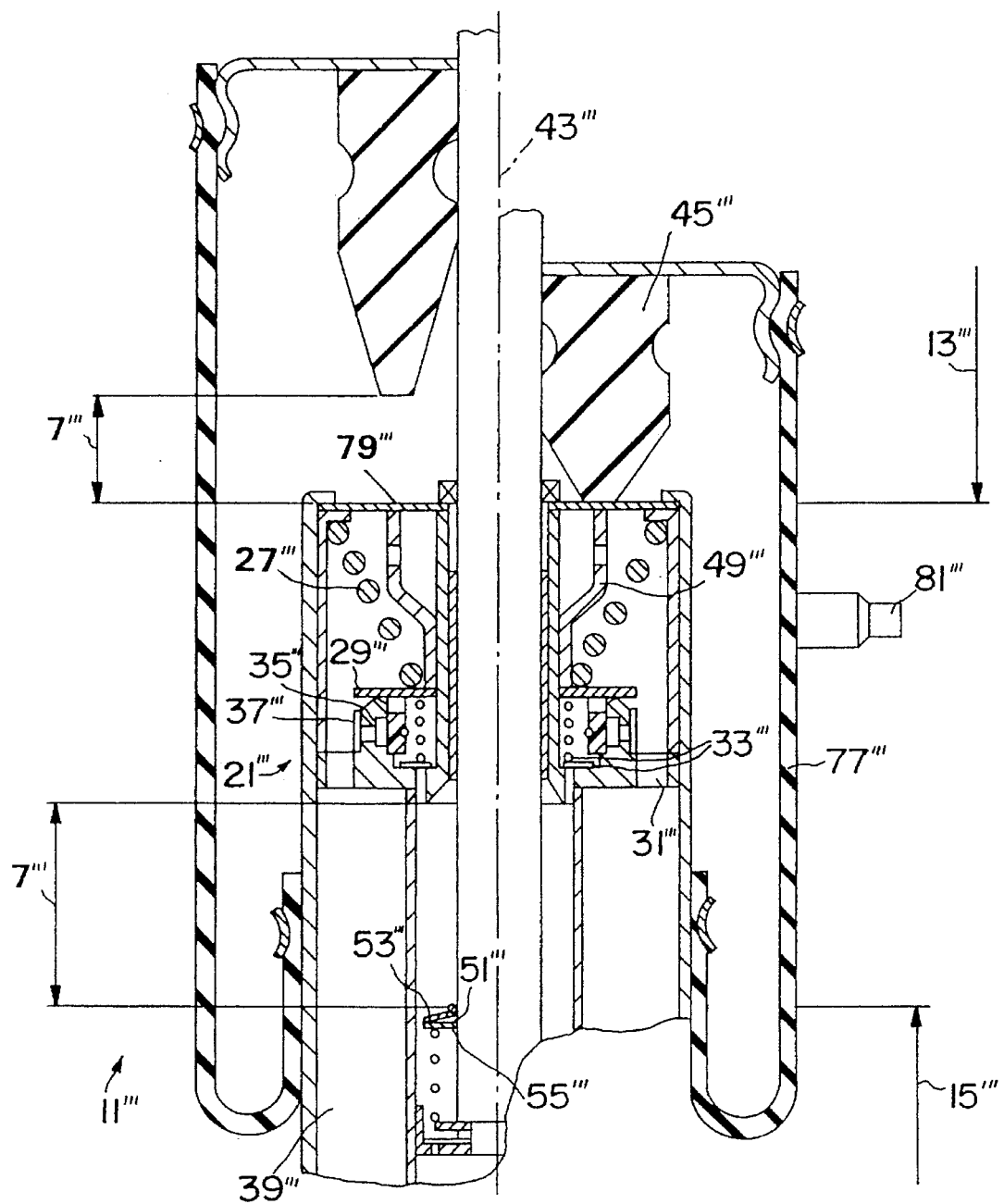

FIG. 15 shows a shock absorber with load-independent damping, on which there is a pneumatic spring with a level control system as a vehicle suspension spring. The essential structure is the same as illustrated in FIG. 13, with the distinction that a pneumatic spring designed as an expansion bellows 77''' is used as the vehicle suspension spring.

The load-independent operation within the damping force family of characteristics 7''' of the shock absorber 11''' is based on a process whereby the air pressure inside the expansion bellows 77''' pressurizes a membrane 79''', which is sealed off from the equalization chamber 39''' and is rigidly braced on the inside and outside diameter, independently of the valve disc 49'''.

The very degressive damping force of the damping device 21''' is determined by the conical coil spring 27''', and within the first damping force family of characteristics 7''' no additional forces are exerted on the valve disc 29'''. Only after the transition between the first damping force family of characteristics 7''' and the damping force family of characteristics 13''' does a pressure pad 45''' come in contact with the membrane 79''' which acts via a control sleeve 49''' to transmit the force to the valve disc 29''', so that the rest of the stroke in the insertion direction of the piston rod 43''' results in a sharply progressive damping force characteristic. There is a pneumatic connection 81 on the expansion bellows 77''' to regulate the level.

Figure 16:
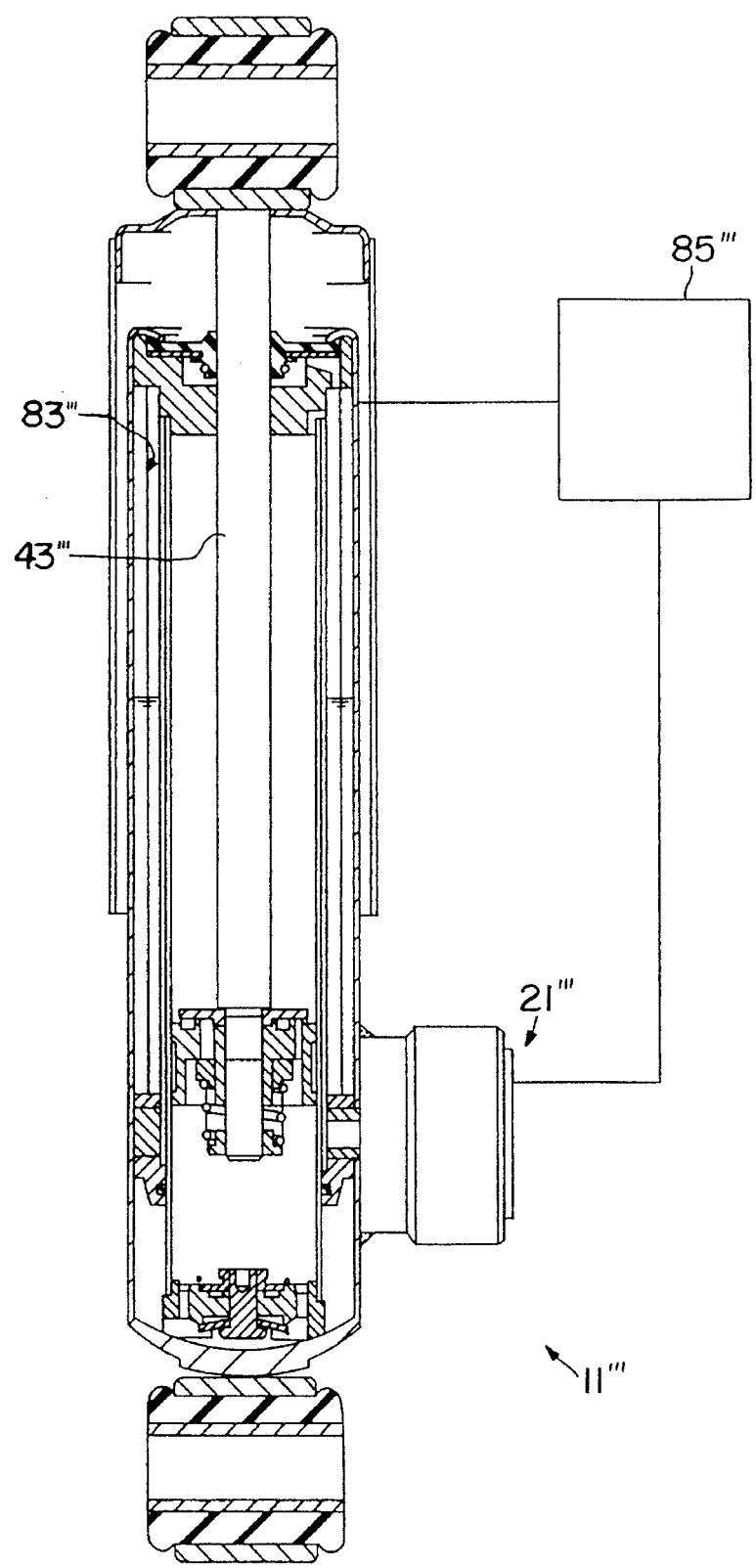

FIG. 16 shows a shock absorber 11''' with a damping force which can be adjusted by means of a damping device 21''' connected in parallel. The basic structure is the same as that of the prior art, so that the description has been restricted to its essential features.

The shock absorber 11''' is equipped with a position detection device 83''' which senses the stroke length of the shock absorber 11'''. The signal generated by the position detection device 83''' is transmitted to a computer 84''' which has the damping force family of characteristics 1''', among other things, stored in its memory. The normal position 9''' of the shock absorber 11''' can be determined by means of the position detection device 83'''. For example, after the vehicle ignition is turned on, the signal from the position detection device 83''' can be defined as the reference signal. The position of the damping force family of characteristics 7''' is thus clearly and very easily determined. The stroke length for the damping force family of characteristics 7''' is also stored in the computer's memory. If a signal is transmitted to the computer by the position detection device 83''' which corresponds to a stroke position outside the first damping force family of characteristics 7''', then there is a continuous transition from the softening damping force setting, independent of the stroke direction, to a harder damping force setting of the damping device 21'''. The desired progressive damping force curve within the harder damping force setting can be very easily realized by continuously sensing the stroke position, and by hardening the damping force setting as the shock absorber approaches its limit positions. One feature of the invention resides broadly in the vehicle, comprising a vehicle body, a chassis with wheels and tires on which the vehicle rests, a number of vehicle suspension springs and shock absorbers which are mounted between the wheels and the vehicle body and execute a change in their axial length as a function of the wheel spring travel in the form of a displacement between a piston fastened to a piston rod and a pressure tube of the shock absorber, and thereby displace a damping medium through a damping device, as well as means to fasten the piston rod and the pressure-tube to the vehicle body and the wheel, characterized by the fact that the shock absorber 11 has a damping force family of characteristics 1 which consists of at least three individual damping force families of characteristics 7, 13, 15, the first damping force family of characteristics 7 of which is designed so that it exerts a very low damping force, whereby this damping force family of characteristics 7 is located in the vicinity of the normal spring deflection range of the shock absorber 11, and makes a transition in the decompression and compression directions respectively into damping force families of characteristics 13, 15 which entail a greater damping force in relation to the stroke length, compared to the first damping force family of characteristics 7.

Another feature of the invention resides broadly in the shock absorber for a vehicle, characterized by the fact that the first damping force family of characteristics 7, in relation to the spring deflection velocity, includes a sharply degressive damping force behavior.

Yet another feature of the invention resides broadly in the shock absorber for a vehicle, characterized by the fact that the damping force families of characteristics 13, 15 adjacent to the first damping force family of characteristics 7 for the decompression and compression stage include a progressive damping force behavior in relation to the spring deflection velocity.

Still yet another feature of the invention resides broadly in the shock absorber for a vehicle, characterized by the fact that the stroke length for the first damping force family of characteristics 7 has a length of less than 10 mm.

Yet still another feature of the invention resides broadly in the shock absorber for a vehicle, characterized by the fact that the damping force families of characteristics 13, 15, except for the first one 7, each have a hydraulic and/or mechanical stop 45, 51.

Another feature of the invention resides broadly in the shock absorber for a vehicle, characterized by the fact that the shock absorber 11 is load-controlled.

Still another feature of the invention resides broadly in the shock absorber for a vehicle, characterized by the fact that the shock absorber 11 is connected to a level control system.

Yet another feature of the invention resides broadly in the shock absorber for a vehicle, characterized by the fact that the area of the damping force characteristic 17, in relation to the stroke length, is at least as great as in a shock absorber with a constant damping force characteristic in relation to the stroke length.

Yet still another feature of the invention resides broadly in the shock absorber for a vehicle, characterized by the fact that the first damping force family of characteristics 7 has a maximum stroke velocity in the compression direction of 2 m/s.

Still yet another feature of the invention resides broadly in the shock absorber for a vehicle, characterized by the fact that the stroke length for the first damping force family of characteristics 7 is designed as a bypass channel in the pressure tube of the shock absorber.

Still another feature of the invention resides broadly in the shock absorber for a vehicle, characterized by the fact that the shock absorber 11 has an adjustable damping device 21 in connection with a position detection device 83, which transmits a position signal to a computer 85 which, on the basis of the position signals, determines the damping force families of characteristics 7, 13, 15, and specifies the softest damping force setting for the first damping force family of characteristics 7, and an increasingly harder damping force setting for the additional damping force fields 13, 15 located farther in the direction of the end positions of the shock absorber 11.

Furthermore, another feature of the invention resides broadly in the shock absorber, characterized by the fact that the load-dependent damping valve (V2) is located inside the piston rod guide (23), whereby the damping valve (V2) is connected in series with the an additional load-independent damping valve (V1).

Yet another additional feature of the invention resides broadly in the shock absorber, characterized by the fact that the load-dependent damping valve (V2) is actuated by the vehicle suspension spring (59).

Still yet another additional feature of the invention resides broadly in the shock absorber, characterized by the fact that the load-dependent damping valve is also pressurized by a pressure pad (45).

Yet another additional further feature of the invention resides broadly in the shock absorber, characterized by the fact that a damping valve (VO3,ZD) additively superimposed on the two damping valves (V1,V2) in the piston rod guide is located in the piston.

Still yet another additional further feature of the invention resides broadly in the shock absorber, characterized by the fact that there is a pressure relief valve (25b) for the decompression direction.

Yet still another additional further feature of the invention resides broadly in the shock absorber, characterized by the fact that the sealed cylinder (63) has an essentially constant cross section.

Still another yet additional further feature of the invention resides broadly in the shock absorber, characterized by the fact that there is a gas pocket (65) located inside the equalization, chamber (39).

It will be appreciated from the foregoing that the present invention, in at least one aspect thereof, can preferably be directed to a vehicle, comprising a vehicle body, a chassis with wheels and tires on which the vehicle rests, a number of vehicle suspension springs and shock absorbers which are mounted between the wheels and the vehicle body and execute a change in their axial length as a function of the wheel spring travel in the form of a displacement between a piston fastened to a piston rod guided by a piston rod guide, and a pressure tube of the shock absorber, and thereby displace a damping medium through a damping device, as well as means to fasten the piston rod and the pressure tube to the vehicle body and the wheel, characterized by the fact that the shock absorber has a damping force family of characteristics which consists of at least three individual damping force families of characteristics, the first damping force family of characteristics of which is designed so that it exerts a very low damping force, whereby this damping force family of characteristics is located in the vicinity of the normal spring deflection range of the shock absorber, and makes a transition in the decompression and compression directions respectively into damping force families of characteristics which entail a greater damping force in relation to the stroke length, compared to the first damping force family of characteristics.

Examples of shock absorber assemblies which may be utilized in accordance with the embodiments of the present invention may be found in the following U.S. Pat. Nos. 4,838,393, entitled "Hydro-mechanical Stop having a Restrictive Passage", which issued to Mourray et al. on Jun. 13, 1989; No. 4,817,928, entitled "Suspension System", which issued to Paton on Apr. 4, 1989; No. 4,527,674, entitled "Shock Absorber with a Hydro-mechanical Stop", which issued to Mourray on Jul. 9, 1985; No. 4,962,916, entitled "Compression Spring", which issued to Palinkas on Oct. 16, 1990; and No. 4,756,516, entitled "Resiliently Deformable Element Usable as an End Stop in a Motor Vehicle Suspension", which issued to Tondato on Jul. 12, 1988.

Examples of control arrangements, which may be utilized in accordance with the embodiments of the present invention, may be found in the following U.S. Pat. Nos. 4,989,148, which issued to Gürke et al. on Jan. 29, 1991; No. 4,765,648, which issued to Mander et al. on Aug. 23, 1988; No. 4,664,409, which issued to Nakashima et al. on May 12, 1987; No. 4,869,528, which issued to Buma et al. on Sep. 26, 1989; and No. 4,853,860, which issued to Achenbach on Aug. 1, 1989.

All, or substantially all, of the components and methods of the various embodiments may be used with at least one embodiment or all of the embodiments, if any, described herein.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber in a motor vehicle, such a motor vehicle including: a vehicle body; a chassis supporting said vehicle body, said chassis comprising at least two axles and at least two pairs of wheels, each said at least two pairs of wheels being mounted on a corresponding one of said axles, a suspension connected between a corresponding one of said axles and said vehicle body, the suspension being movable through an entire stroke range, said entire stroke range extending between an upper limit, wherein the corresponding axle between an upper limit, wherein the corresponding axle is disposed in closest vertical proximity to a point of reference on said vehicle body, and a lower limit, wherein the corresponding axle is disposed at a maximum vertical distance from said point of reference on said vehicle body, wherein said shock absorber is for being connected between one of the wheels and the vehicle body and is for being oriented generally in parallel with respect to the suspension; said shock absorber comprising:

a sealed cylinder defining a chamber therein, said cylinder containing a damping fluid;

a piston rod sealingly protecting into said cylinder and being axially displaceable with respect to said cylinder;

a piston being attached to said piston rod, said piston rod being slidably disposed within said cylinder to sealingly divide said chamber into first and second chambers;

means for permitting flow of damping fluid between said first and second chambers;

said piston being displaceable through an entire stroke range, said entire stroke range generally corresponding to the entire stroke range of the suspension;

said piston being displaceable through a first stroke range and a second stroke range, said first stroke range being different from said second stroke range;

means for damping the movement of said piston as a function of the displacement of said piston;

said damping means comprising:
first damping means for providing a first damping force function when said piston is being displaced through said first stroke range;
second damping means for providing a second damping force function when said piston is being displaced through said second stroke range;
said first damping force function varying as a first function of the displacement of said piston; and
said second damping force function varying as a second function of the displacement of said piston, said second function being different from said first function;

means for effecting a change in damping between said first damping force function and said second damping force function in relation to at least one position of said piston within a substantial portion of said entire stroke range of said piston;

said first stroke range is directly adjacent said second stroke range such that, when the displacement of said piston goes through one of said at least one position, the change in damping between said first damping force function and said second damping force function is effected;

said piston is additionally displaceable through a third stroke ranger said third stroke range being different from said first stroke range and said second stroke range;

said damping means further comprises third damping means for providing a third damping force function when said piston is displaced through said third stroke range;

said third damping force function varies as a third function of the displacement of said piston, said third function being different from said first function;

said shock absorber comprises means for effecting a change in damping between said first damping force function and said third damping force function in relation to at least one position of the suspension within a substantial portion of the entire stroke range of the suspension;

said third stroke range is directly adjacent said first stroke range, such that, when the displacement of said piston goes through one of said at least one position relating to the change in damping between said first damping force function and said third damping force function, the change in damping between said first damping force function and said third damping force function is effected;

said second damping force function is greater with respect to the displacement of said piston than is said first damping force function;

said third damping force function is greater with respect to the displacement of said piston than is said first damping force function;

said means for permitting flow of damping fluid between said first and second chambers comprises flow passage means, said flow passage means being configured for providing fluid communication between said first and second chambers;

said second damping means comprises means for constricting the flow of damping fluid through said flow passage means as a function at least of the stroke of said piston within said second stroke range to provide said second damping force function;

said third damping means comprises means for constricting the flow of damping fluid through said flow passage means as a function at least of the stroke of said piston within said second stroke range to provide said third damping force function;

said at least one position relating to the change in damping between said first damping force function and said second damping force function comprises a transition point of the displacement of said piston between said first stroke range and said second stroke range;

said at least one position relating to the change in damping between said first damping force function and said third damping force function comprises a transition point of the displacement of said piston between said first stroke range and said third stroke range;

said transition point between said first stroke range and said second stroke range defining a first limit of said first stroke range;

said transition point between said first stroke range and said third stroke range defining a second limit of said first stroke range;

said first stroke range extending solely between said first limit and said second limit;

said first limit and said second limit being disposed about a quiescent point of said shock absorber;

said first damping means is configured such that said first damping force function is strongly degressive with respect to at least the velocity of said piston, such that, for increased velocity of said piston, the rate of increase of damping strongly decreases;

said second damping means is configured such that said second damping force function is progressive, above a given velocity of said piston, with respect to the velocity of said piston, such that, above said given velocity of said piston, for increased velocity of said piston, the rate of increase of damping increases;

said third damping means is configured such that said third damping force function is progressive, above a given velocity of said piston, with respect to the velocity of said piston, such that, above said given velocity of said piston, for increased velocity of said piston, the rate of increase of damping increases;

said shock absorber having a central longitudinal axis defined through said sealed cylinder, the central longitudinal axis defining a longitudinal direction of the shock absorber;

said first stroke range extending along the longitudinal direction for less than about 10 millimeters;

said first damping force function, said second damping force function and said third damping force function each combining to produce a general damping force characteristic curve of damping force as a function of displacement of said piston over substantially the entire stroke range of the suspension;

the area under said general damping force characteristic curve being at least as great as that for a shock absorber with a damping force which varies as only one function of displacement of said piston over substantially the entire stroke range of the suspension;

said first damping force function having a maximum stroke velocity, in a compression direction of said piston, of about two meters per second;

said shock absorber comprising a guide for guiding longitudinal displacement of said piston rod;

said flow passage means comprising:
an intermediate chamber;
an inlet passage for directing the damping fluid into said intermediate chamber;
an outlet passage for directing the damping fluid out from said intermediate chamber;

said constricting means of said second damping means comprising:
a valve disc, said valve disc being positioned adjacent said outlet passage and being displaceable with respect to said outlet passage to at least partly close at least a portion of said outlet passage;

said outlet passage being positioned at an end of said intermediate chamber such that, both during compression and decompression strokes of said piston, damping fluid flows out from said intermediate chamber past said valve disc;

pin means for supporting said valve seat with respect to said outlet passage, said pin means being oriented generally parallel to the longitudinal axis of said shock absorber;

said pin means having a first end portion and a second end portion;

said shock absorber comprising end plate means disposed at an end of said shock absorber, said end plate means being oriented generally perpendicular with respect to the longitudinal axis of said shock absorber, said end plate means defining one end of said sealed cylinder;

said first end portion of said pin means being braced against said end plate means of said shock absorber;

said second end portion of said pin means being braced against a portion of said valve seat to hold said valve seat in position relative to said outlet passage; said first damping means comprising:

an advance opening disc and a slotted disc disposed adjacent one another, said advance opening disc and said slotted disc establishing an advance opening cross section of said inlet passage;

said inlet passage having a first end and a second end, said second end being disposed adjacent said intermediate chamber, said advance opening disc and said slotted disc being disposed at said second end of said inlet passage;

valve spring means for biasing said advance opening disc towards said slotted disc and said second end of said inlet passage, and for providing a low damping force when said piston is being displaced through said first stroke range;

said second damping means comprising a pressure pad for pressing on said end plate means of said shock absorber upon displacement of said piston from said first stroke range into said second stroke range;

said end plate means being configured for axially displacing said pin means simultaneously with the pressing of said pressure pad on said end plate means;

said pin means being configured to displace said disc means as a function of contact of said end plate means with said pressure pad, to consequently constrict the flow of damping medium past said valve disc through said outlet passage and increase damping as function of the stroke of said piston within said second stroke range;

said constricting means of said third damping means comprising spring plate means for engaging with said inlet passage upon displacement of said piston from said first stroke range into said third stroke range;

said spring plate means being configured for constricting said inlet passage as a function of of the stroke of said piston within said third stroke range to consequently constrict the flow of damping medium through said inlet passage and increase damping as a function of the stroke of said piston within said third stroke range;

an intermediate chamber housing for housing said intermediate chamber therewithin, said inflow passage being disposed through said intermediate chamber housing;

said first stroke range corresponding to non-contact of said end plate means with said pressure pad and non-contact of said spring plate means with said intermediate chamber housing;

said second damping means being disposed within said guide;

said second damping means being load-dependent;

said first damping means being load-independent;

said second damping means having means for being actuated by a suspension spring of a suspension;

said shock absorber further comprises fourth damping means;

said fourth damping means being disposed in said piston;

said fourth damping means having means for providing a fourth damping function for being additively superimposed at least on said first and second damping functions;

said fourth damping means comprises a pressure relief valve for a decompression direction of said piston;

said cylinder has an essentially constant cross-section;

said cylinder comprises an equalization chamber;

said outlet passage for directing fluid into said equalization chamber;

said outlet passage and said equalization chamber meeting at a connection region;

a gas pocket, disposed inside said equalization chamber, for ensuring that the connection region of said outlet passage and said equalization chamber is always filled with damping medium, so that no foaming effects can occur;

said slotted disc having at least one slot disposed therein for admitting damping fluid from said inlet passage to said intermediate chamber;

said advance opening disc being separate from said slotted disc;

said shock absorber being load-controlled;

said shock absorber having a flange portion, at an external portion of said shock absorber, for accommodating an end of the suspension spring; and the suspension spring being configured for predetermining an initial damping force by transferring an initial load to said shock absorber by way of said flange portion.

\* \* \* \* \*

UNITED STATES PATENT AND TRADEMARK OFFICE
CERTIFICATE OF CORRECTION

PATENT NO. : 5,509,512
DATED : April 23, 1996
INVENTOR(S) : Manfred GRUNDEI

It is certified that error appears in the above-indentified patent and that said Letters Patent is hereby corrected as shown below:

In Column 18, line 12, Claim 1, after 'sealingly' delete "protecting" and substitute therefore --projecting--.

In Column 18, line 54, Claim 1, after the first occurrence of 'stroke' delete "ranger" and substitute therefore --range,--.

Signed and Sealed this

Sixth Day of August, 1996

Attest:

BRUCE LEHMAN

Attesting Officer

Commissioner of Patents and Trademarks